US011199221B1

(12) United States Patent
Mauro et al.

(10) Patent No.: US 11,199,221 B1
(45) Date of Patent: Dec. 14, 2021

(54) PRECISION SINGLE-BEARING SET ROLLER GUIDE WHEEL AND LOW PROFILE POSITIONING STAGES USING THE SAME

(71) Applicant: Donna Christine Mauro, Sebastian, FL (US)

(72) Inventors: George Edward Mauro, Sebastian, FL (US); Donna Christine Mauro, Sebastian, FL (US); Dennis Willard Davis, Palm Bay, FL (US)

(73) Assignee: Mauro Commercial Industries of Vero Beach, LLC, Sebastian, FL (US)

(*) Notice: Subject to any disclaimer, the term of this patent is extended or adjusted under 35 U.S.C. 154(b) by 0 days.

(21) Appl. No.: 16/873,741

(22) Filed: Jun. 19, 2020

Related U.S. Application Data

(63) Continuation-in-part of application No. 16/501,626, filed on May 13, 2019, now abandoned, which is a continuation-in-part of application No. 15/530,180, filed on Dec. 9, 2016, now abandoned.

(60) Provisional application No. 62/386,757, filed on Dec. 10, 2015.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16C 19/16* | (2006.01) |
| *B23Q 3/18* | (2006.01) |
| *F16C 33/58* | (2006.01) |

(52) U.S. Cl.
CPC .............. *F16C 19/16* (2013.01); *B23Q 3/18* (2013.01); *F16C 33/583* (2013.01); *F16C 2326/00* (2013.01)

(58) Field of Classification Search
CPC ...... F16C 19/06; F16C 29/126; F16C 29/005; F16C 29/04; F16C 19/466
See application file for complete search history.

(56) References Cited

U.S. PATENT DOCUMENTS

| | | | | | |
|---|---|---|---|---|---|
| 2,327,384 | A | * | 8/1943 | Annesley | ............ B02C 2/06 74/86 |
| 4,012,086 | A | * | 3/1977 | Kruse | ............ F16C 35/063 384/541 |
| 4,223,962 | A | * | 9/1980 | Zielfleisch | ........... F16C 19/466 384/582 |
| 4,436,463 | A | * | 3/1984 | Rea | ............ B23B 31/113 279/144 |

(Continued)

*Primary Examiner* — Jake Cook

(57) ABSTRACT

A roller guide wheel contains a single set of spherical bearings and is constructed with a precision outer race machined into the guide wheel interior and an inner race formed by the surfaces of two conically-tapered set screws that affix the roller guide wheel within a housing made part of a stage slider. The roller guide wheel, which contacts a rail on one side of the stage body and exhibits a non-nutating axis of rotation, serves as way for the translating slider. The way on the opposing side of the slider is a set of v-groove contacts that make sliding contact with a rail on the corresponding side of the stage body. A flexure is machined into the slider permitting preload of the slider contacts points with the rails. The stage geometry permits a large slider through-hole and the use of alternative way mechanisms with the roller guide wheel.

15 Claims, 39 Drawing Sheets

(56) References Cited

U.S. PATENT DOCUMENTS

| | | | | |
|---|---|---|---|---|
| 5,067,955 A | * | 11/1991 | Cotrel | A61B 17/7034 606/306 |
| 5,074,678 A | * | 12/1991 | Eberle | F16C 29/04 384/49 |
| 5,190,354 A | * | 3/1993 | Levy | B60B 7/20 301/37.25 |
| 5,855,377 A | * | 1/1999 | Murphy | B23B 31/201 279/50 |
| 5,876,127 A | * | 3/1999 | Casey | F16C 35/073 384/538 |
| 6,113,273 A | * | 9/2000 | Eberle | B65G 21/22 384/40 |
| 2010/0290730 A1 | * | 11/2010 | Ostling | F16C 35/073 384/571 |

* cited by examiner

Pitch
Displacement

Roll
Displacement

| | |
|---|---|
| Hybrid - Slider A side: Single wheel | Stage Body B side:<br>V-groove slider<br>Box way<br>Prismatic way<br>Dovetail way<br>Ball bearings<br>Roller bearings<br>Multiple wheels |
| Hybrid - Slider A side: Multiple wheels | Stage Body B side:<br>V-groove slider<br>Box way<br>Prismatic way<br>Dovetail way<br>Ball bearings<br>Roller bearings<br>Multiple wheels |

Fig. 22G

Section A - A

PRECISION SINGLE-BEARING SET ROLLER GUIDE WHEEL AND LOW PROFILE POSITIONING STAGES USING THE SAME

CROSS-REFERENCE TO RELATED APPLICATIONS

This application is a continuation-in-part of U.S. patent application Ser. No. 16/501,626 filed May 13, 2019 which is a continuation-in-part of U.S. patent application Ser. No. 15/530,180, filed Dec. 9, 2016, now abandoned and claims the benefit of U.S. provisional application Patent Application Ser. No. 62/386,757, filed Dec. 10, 2015 for "Precision Single-Bearing Set Roller Guide Wheel and Low Profile Positioning Stages Using the Same" by George E. Mauro, Donna C. Mauro, and Dennis W. Davis.

BACKGROUND OF THE INVENTION

Precision motion devices such as linear positioning stages must rely on parts machined to adequate tolerances, the judicious use of preloading strategies, kinematic constraints, and proper choice of rolling and sliding interfaces. The costs associated with the manufacture of such devices can be minimized by avoiding the need for extreme tolerances and complex structures through the exploitation of informed design tradeoffs and methods that average out contributory errors.

Central to the design of the presently disclosed device are the following chief areas of technology, a) single bearings with defined race geometries, b) linear positioning slides or stages supported by roller wheels, and c) rotary stages exploiting roller wheels.

The geometry of the inner race of the presently-disclosed bearing is bi-conical for reasons that will be discussed below. Hence, prior art of relevance concerns bearing designs exhibiting inner races with conical surfaces. Prior art pivot bearings as shown in FIGS. 1A and 1B have single conical bearing surfaces. In FIG. 1, the axis of the rotating shaft is constrained by the seating of the pointed shaft end. This is in contrast to the geometry of FIG. 2 from U.S. Pat. No. 1,907,792. The latter is a rugged bearing replacement for jeweled bearings in clocks and watches and permits wobble of the shaft axis of rotation. In the device of FIG. 1C, a tapered shaft provides an inner race surface, while a cylindrical and tapered cavity provides an outer race surface resulting in a three-point bearing contact. A bi-conical inner race geometry is portrayed in FIG. 3 of U. S. Pat. No. 2,622,948. The bearings of this device also make three-point contact with the associated race.

Prior art single bearing sets for roller wheels fail to achieve the goals of precise motion, stationary rotation axis, ease of manufacture and assembly, and low cost necessary to meet the market requirements for precision linear stages.

Precision linear positioning stages are used for laboratory and industrial applications including fiber optic and optical alignment systems. Prior art positioning stages include the use of various machinery ways such as dovetail (and friction slide) guides, ball bearings, and crossed roller bearings. U.S. Pat. No. 790,811 discloses a track or way that uses both sliding friction and rollers; these are combined on one track. U.S. Pat. No. 5,492,414 discloses a modified ball slide in which one side of the slide is supported by a series of ball or roller bearings and the opposing side of the slide is supported by a rack and pinion mechanism. U.S. Pat. No. 4,648,725 discloses various combinations of guide for a supported slider including roller bearings on one side of the slider and friction slider on the other.

Use of these way alternatives in conventional linear stages fails to provide a compact, low profile stage with a large ratio of slider area to stage footprint that can be manufactured cost-effectively.

BRIEF SUMMARY OF THE INVENTION

The chief goal of the presently disclosed concept is to achieve a low profile, precision kinematic translation stage exhibiting stability, good range of travel, a load bearing capacity comparable to its weight, and ease of manufacture. Central to the disclosed device is a precision roller guide wheel which exhibits a fixed rotation axis as it rides on a stage body rail. This roller guide wheel makes use of a single spherical bearing set contained within a precision outer race machined into the interior of the wheel and a bi-conical inner race formed by two conical set screws that are both advanced toward each other by screwing them into a housing that captivates the roller guide wheel. This guide wheel and associated rail are used as a rolling type of machinery way to support motion of a precision linear stage slider. The second way that is used for the opposing side of the stage slider is selected from among alternative types of ways. In a preferred embodiment, the second way comprises a set of v-groove contacts with a second precision rail thereby providing a sliding support on this reference surface. The lead screw driving the slider is positioned in close proximity to the sliding support way, thereby minimizing yaw moments on the slider from the friction contact. The use of the rolling contact on the other side of the slider permits adequate preload to be applied between the roller and rail that is accommodated by a flexure machined into the slider. Various embodiments of the precision linear stage include a) an end drive motor geometry (for the side drive lead screw) to facilitate a large slider through-hole and combinations of different ways used in concert with the roller guide wheel and b) the use of a linear motor in lieu of a geared rotary motor with lead screw.

The following definitions serve to clarify the disclosed and claimed invention:

Flexure refers to a deformable structure that exhibits a spring tension upon deformation. In the presently disclosed device, one or more flexures are created in the stage structure by creating one or more flexible islands of material, that at some location, are relatively thin in the direction of intended deflection or deformation. Conveniently, such a flexible island can be formed by wire cutting a region of the stage slider through its full thickness. Alternatively, the flexure can be created in the body of the stage. The spring tension of the flexure serves to maintain a preload between various parts of the linear stage, more particularly between the rolling or sliding contact surfaces of the opposing ways.

Preload is a tension created in the stage structure to favor semi-kinematic behavior of the stage during motion by inducing compliance of various contacting components. This tension can be supplied by flexures, springs, or material/component compression and can be axial or lateral in nature.

Preload flexure refers to a tensioning mechanism that is in contrast to motion flexures used in prior art translation stages; motion flexures comprise a way mechanism demonstrating smooth motion over small ranges as in the example of piezo-driven translation states. A preload flexure provides a preload tension in direction(s) that force compliant stage components into contact. One important application concerns providing such force to insure support rails make full contact with a stage slider rolling or sliding supports until an operational load placed on the slider is of sufficient magnitude to cause loss of such contact ("breaking of preload").

Linear stage/linear positioning device refers to a mechanism for linear translation of mounted components. A linear stage exhibits mounting surfaces with movement capabilities across one or more axes. The stage may be manually-, rotary motor-, or linear motor-driven and make use of different way mechanisms such as sliders, rollers, and/or bearings.

Roller guide wheel is a wheel exhibiting machined, outer rolling surfaces intended to contact a support rail and exhibiting precision machined interior surfaces that form an outer bearing race for a single set of spherical bearings. A bi-conical inner race is formed by two tapered set screws that are screwed into a roller guide wheel housing that supports the roller guide wheel. The roller guide wheel is designed to exhibit a non-nutating axis of rotation.

Integrated rail refers to way surfaces that are machined into the body of the linear stage. These rails are cylindrical and typically exhibit a curvilinear cross-section. A rail on one side of the stage serves as a primary reference rail to establish precision of linear translation of the stage slider.

Semi-kinematic structure/behavior refers to designs exhibiting kinematic principles (constraint of the motion degrees of freedom) to achieve precision motion, but which exploit line and/or surface contacts in lieu of theoretical point contacts and which exploit mechanical compliance with preloading to insure the integrity of mechanical contacts and resulting accuracy of motion.

Stage refers to the combination of stage body and stage slider.

Rotary stage refers to a stage which comprises a stage body that supports a rotary table.

Contact type refers to the general category of stage body-to-slider contacts comprising both rolling and sliding contacts including v-groove, box, prismatic, and dovetail ways as well as ball bearings, crossed roller bearings, and multiple guide wheels.

Sliding contact refers to those way contacts that evidence sliding friction such as point or area contacts of the slider riding on a rail in translation fashion.

Rolling contact refers to those way contacts that evidence rolling friction such as roller wheels and rolling bearings. Rolling contacts support higher preloading with reduced friction compared to sliding contacts.

Linear motor forcer refers to the coil surrounding a magnet rod, that together with the magnet rod comprise a linear motor.

Objects and Advantages

The primary objects and advantages of the linear stage with precision roller wheel are achievement of a low profile stage design, more options with respect to preload of stage components, smooth accurate motion based on low friction kinematic behavior of the slider and stage body, and increased ratio of slider area to overall stage footprint.

Another object and benefit of the stage is to provide a precision linear stage of relatively simple geometry that is easy to manufacture.

A further object and benefit is achieving the prospect of an advantageous large slider through-hole.

A further object and benefit is enabling increase in preload of the stage slider against the stage body rails without incurring increased friction.

A further object and benefit is enabling low cost in comparison to conventional stage designs by use of simple easily machined components.

A further object and benefit is creation of a stage exhibiting low yaw moments induced on the stage slider by the mechanical ways utilized.

A further object and benefit is creation of a rotary stage exhibiting low rotational axis eccentricity and tilt.

BRIEF DESCRIPTION OF THE DRAWINGS

FIG. 22 is a tabulated pi-trial taxonomy of stage roller and way combinations.

FIG. 22G is a seventh page of the option table that lists hybrid option combinations.

DETAILED DESCRIPTION OF THE INVENTION

Figure 1A:
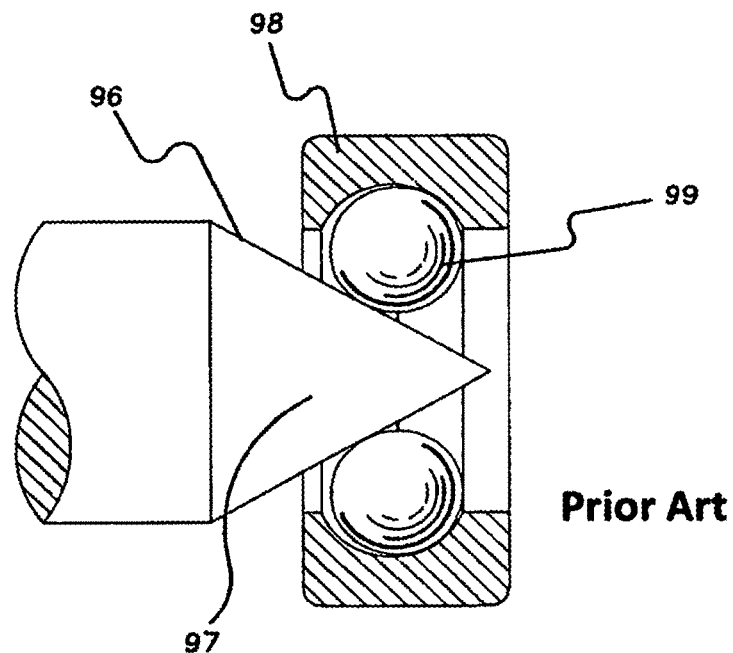
FIG. 1A is a cross-sectional diagram of a first prior art pivot bearing.
Figure 1B:
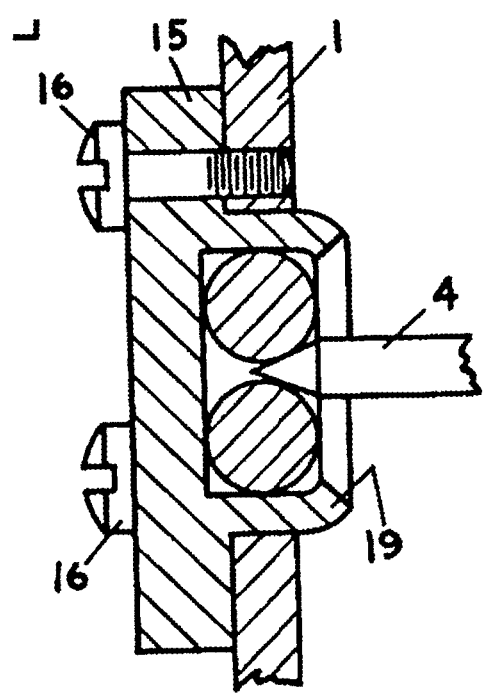
FIG. 1B is a cross-sectional diagram of a second prior art pivot bearing.
Figure 1C:
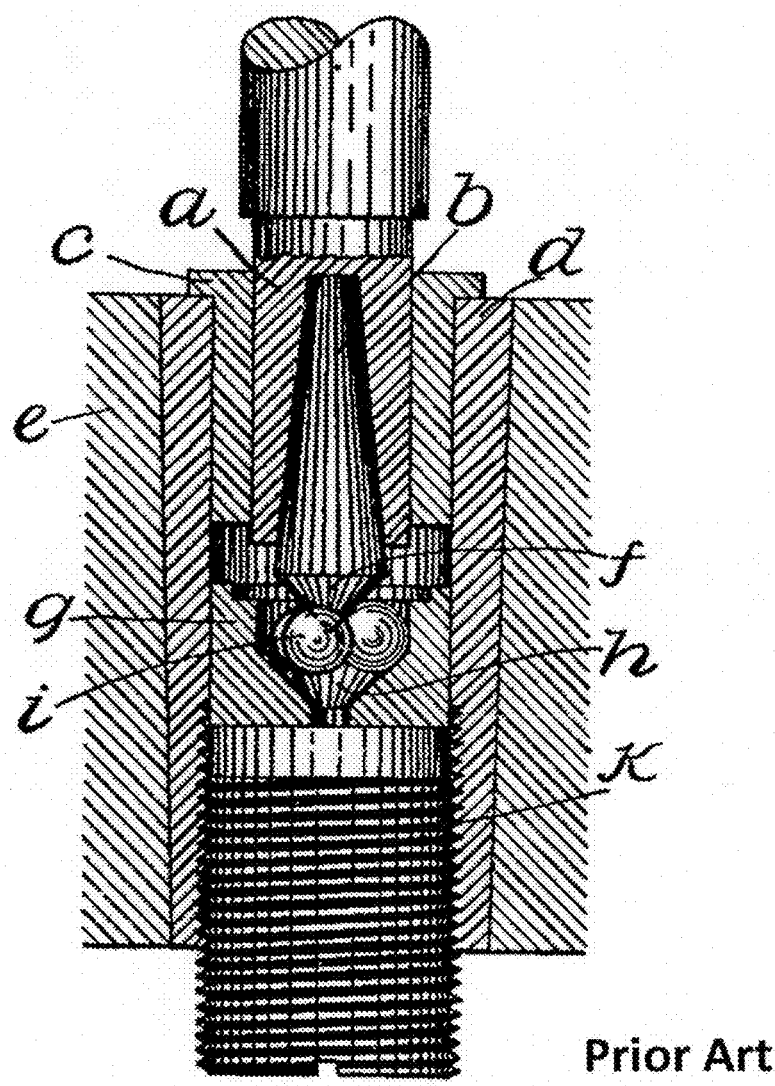
FIG. 1C is a cross-sectional diagram of a prior art three-point contact bearing exhibiting a conical inner race surface.
Figure 1D:
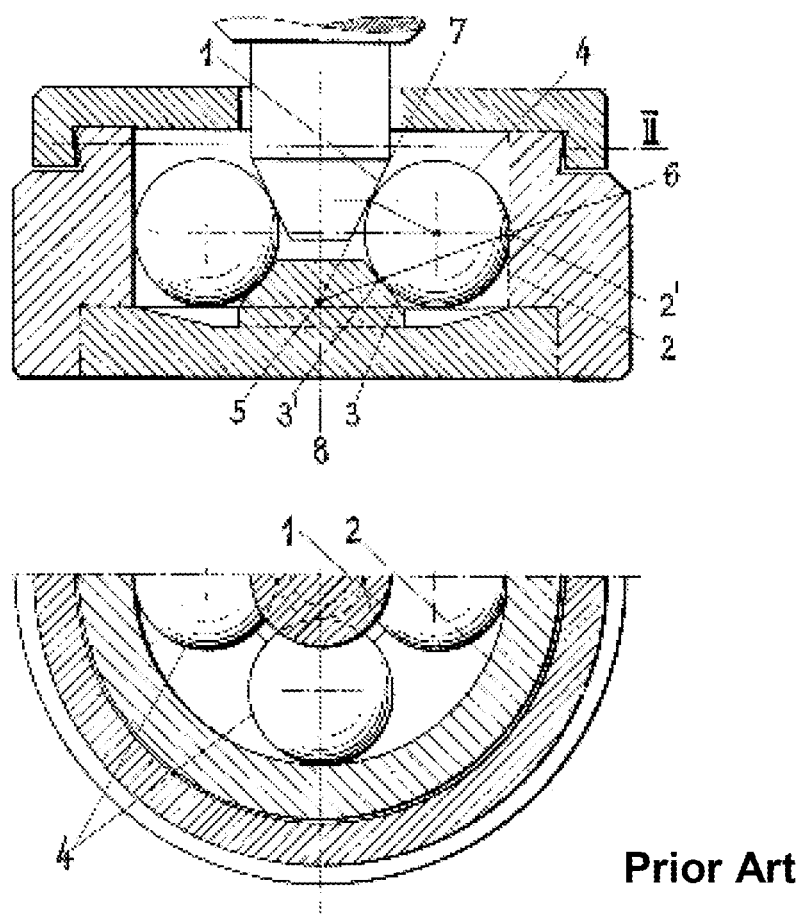
FIG. 1D is a cross-sectional diagram of a prior art bearing with a bi-conical inner bearing race.
Figure 2A:
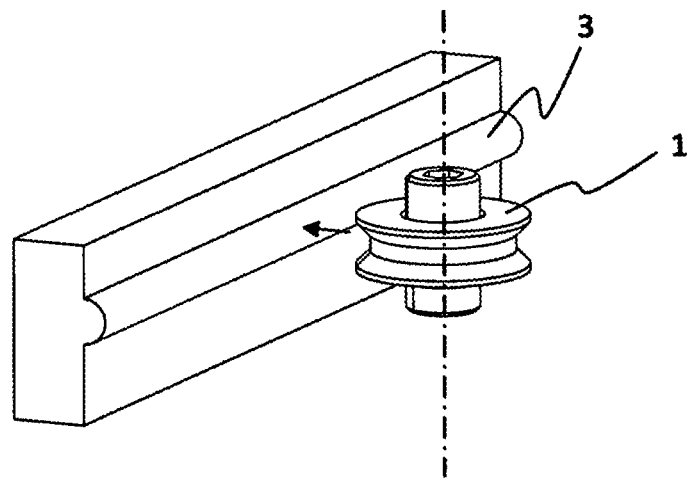
FIG. 2A is a pictorial diagram of a precision roller guide wheel and associated rail.

The construction of means of rolling support for linear stage motion disclosed herein emphasizes achievement of precision motion while minimizing production cost. This is accomplished through a combination of semi-kinematic ways, both rolling and sliding. Specifically, the linear stage geometry makes use of two ways; one way comprises a precision single bearing set roller guide wheel 1 and rail 3 as shown in FIG. 2A. This roller is unique with respect to its construction and with respect to its support of precision motion in applications such as linear stages. The remaining way used in concert with this one, may comprise alternatives that are either rolling or sliding in nature.

Roller Guide Wheel

Figure 2B:
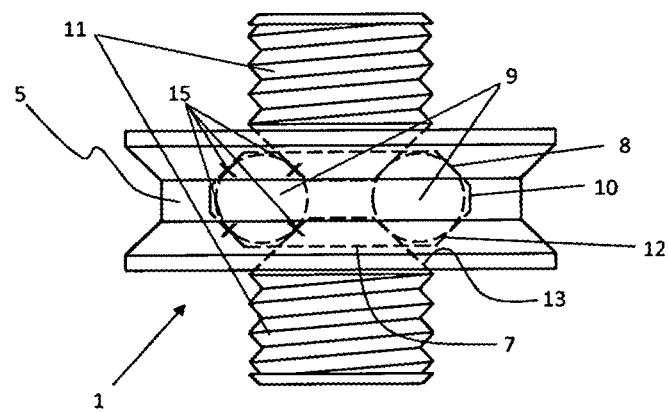
FIG. 2B is a cross-sectional diagram of the precision roller guide wheel.
Figure 2C:
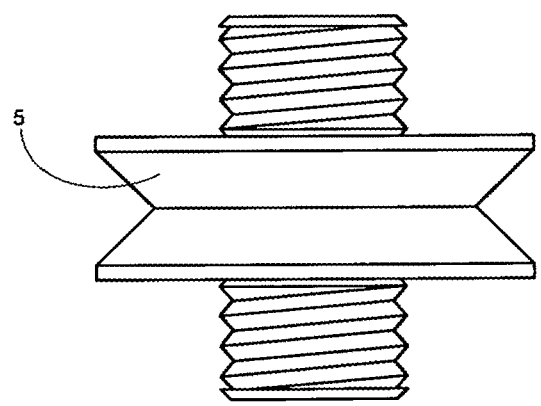
FIG. 2C is pictorial diagram of a v-groove roller guide wheel.
Figure 3A:
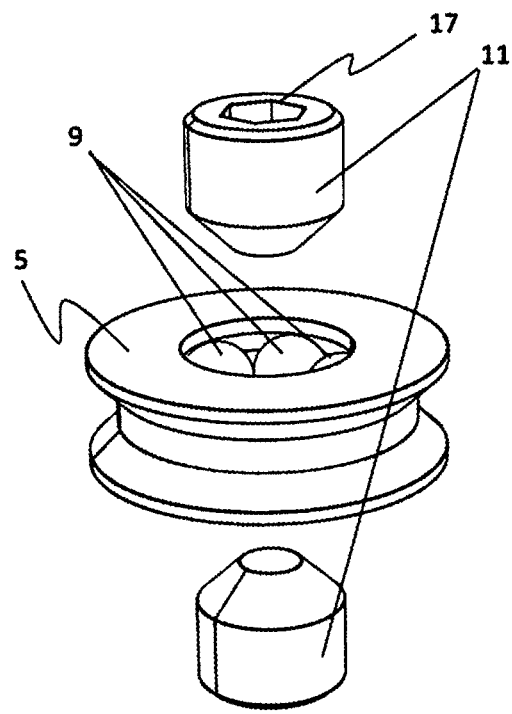
FIG. 3A is a pictorial, exploded diagram of the precision roller guide wheel.
Figure 3B:
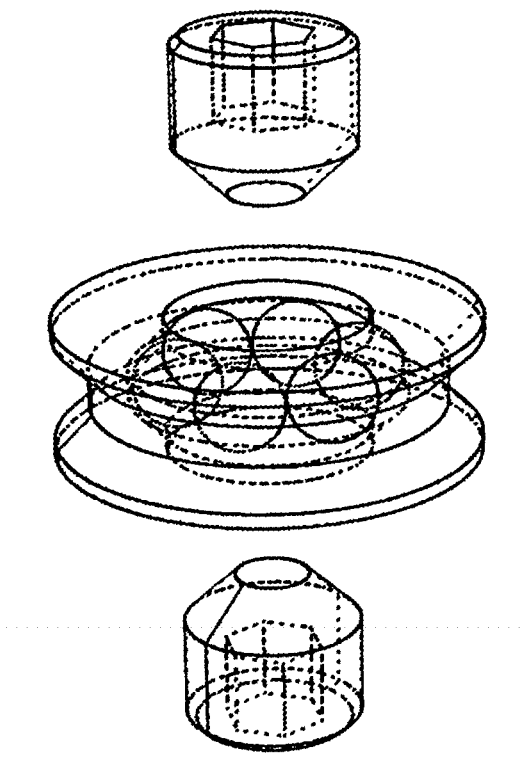
FIG. 3B is a schematic, exploded diagram of the precision roller guide wheel.

The roller guide wheel is central to the basic embodiment of the disclosed device. As shown in FIG. 2B, the roller guide wheel 1 comprises a wheel 5 with an internally machined outer bearing race 7, a set of spherical bearings 9 (only two bearings of a greater plurality are depicted for ease of viewing), and two set screws 11 with conical taper surfaces 13. The outer bearing race 7 comprises three surfaces, cylindrical surface 10 that is contiguous with conical surfaces 8 and 12. This is a four-point contact bearing with each point of contact 15 denoted by an "x". The bearings make contact with the outer bearing race 7 only on conical surfaces 8 and 12. FIG. 2C depicts a v-groove version of a roller guide wheel that would make two-point contact with the rail. FIG. 3A depicts the set screws with hex driver apertures 17, but without the screw threads shown. A plurality of six bearings is shown in FIG. 3B.

Figure 3C:
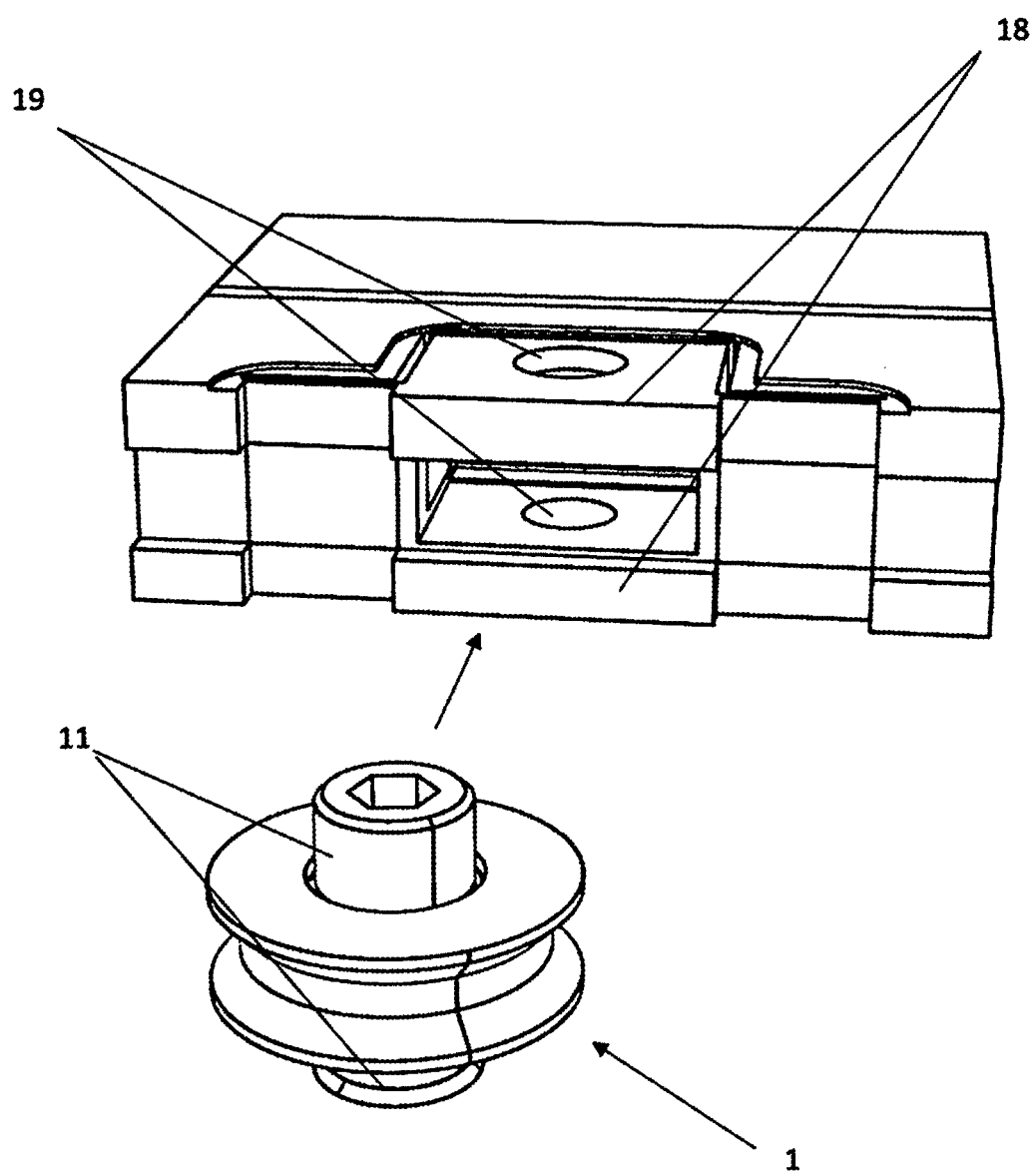
FIG. 3C is a pictorial diagram of the precision roller guide wheel and associated stage slider housing.
Figure 4A:
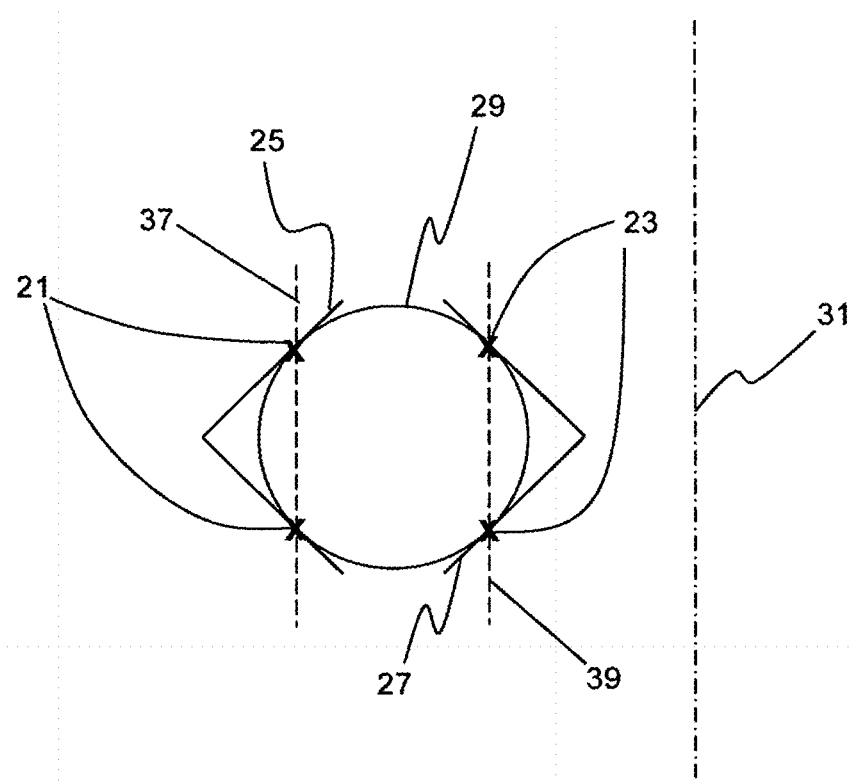
FIG. 4A is a schematic diagram of a first inner and outer bearing race geometry that supports pure rolling motion of the bearings.

FIG. 3C depicts the enclosure 18 into which the wheel 1 is mounted, showing threaded apertures 19 above and below the wheel 1 to receive the set screws 11. Again, with reference to FIG. 2B, when the two set screws 11 are axially advanced by screw adjustment in enclosure 18, their conical surfaces 13 eventually contact the bearings 9 within the wheel 1 to form an inner bearing race. These conical surfaces force the bearings into contact with the precision outer race that is machined into the wheel 5. A preferred number of bearings for this application is 6, but other numbers of bearings can be employed. For the motion speeds encountered in linear translation stage, bearing-to-bearing contact is not an issue and there is no need for a bearing cage. Correct rolling motion of spherical balls in their races can take place only when the points of contact of the balls with the races either lie on conical surfaces or when the points of contact of the balls with each of the respective races lie in lines which are either parallel or at right angles to the shaft axis. (F. J. Jarosch, "The Work of Balls and Ball Raceways in Radial and Thrust Ball Bearings with Respect to Friction and Load Relation," Transactions of the Society of Automobile Engineers, Volume 7, Part 2, 1912, pp. 257-283.) A first case of pure rolling motion is illustrated in FIG. 4A depicting a bearing ball 29 confined by inner and outer races, 27 and 25, respectively, to rotate about axis 31. The points of ball bearing contact 21 with outer race 25 form a line 37 parallel to the rotation axis 31 and contact points 23 on the inner race 27 form another parallel line 39. In FIG.

Figure 4B:
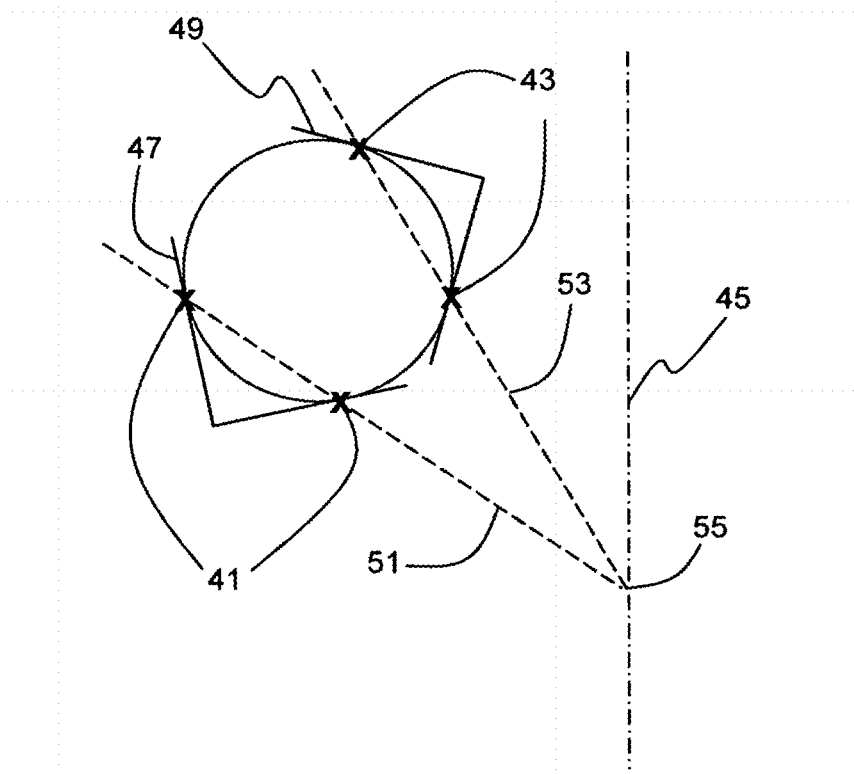
FIG. 4B is a schematic diagram of a second inner and outer bearing race geometry that supports pure rolling motion of the bearings.
Figure 4C:
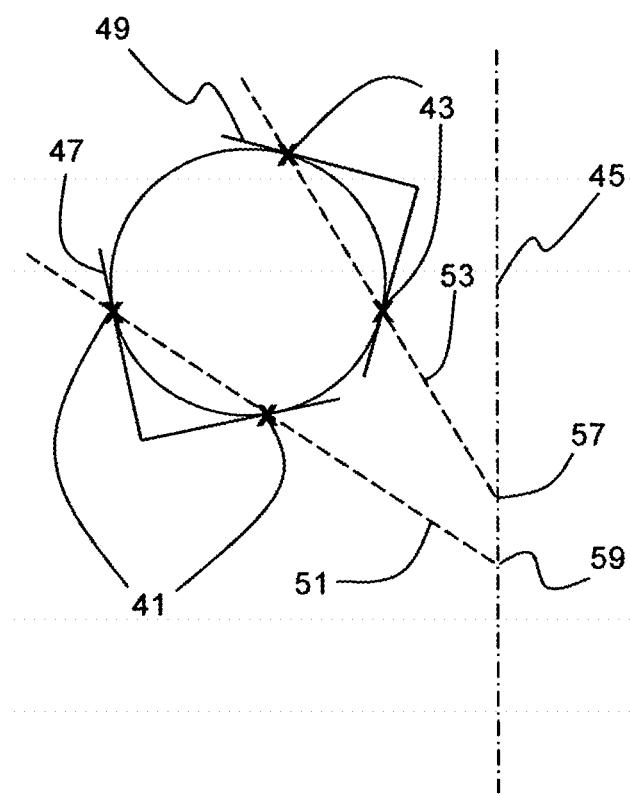
FIG. 4C is a schematic diagram of an inner and outer bearing race geometry that exhibits sliding friction.

4B, the outer race 47 contact points 41 form a line 51 and the inner race 49 contact points 43 form a line 53. These lines intersect at a common point 55 on the axis of rotation 45. This is a second geometry that supports pure rolling motion. In contrast, FIG. 4C depicts a case where the lines 51 and 53 intersect the rotation axis 45 at two different points 57 and 59, rather than a single point. In this geometry, there will be sliding motion. Sliding motion will be present in the case where the two lines of bearing contact depart from parallelism with the rotation axis.

Figure 5A:
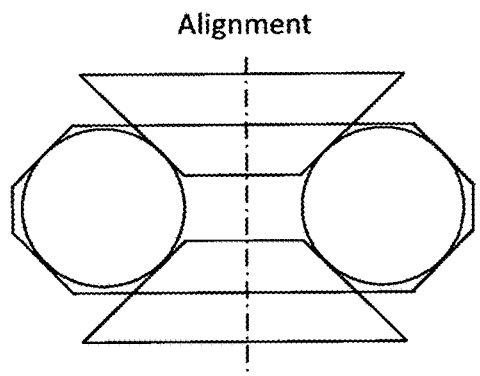
FIG. 5A is a cross-sectional diagram of the roller guide wheel in alignment.
Figure 5B:
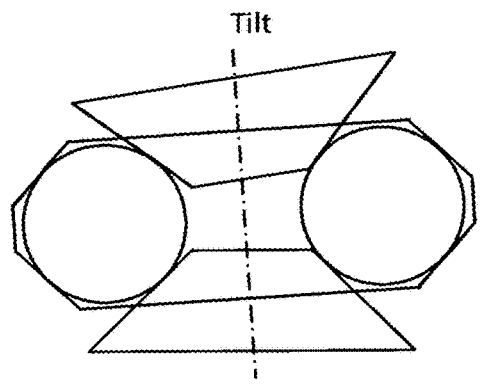
FIG. 5B is a cross-sectional diagram of the roller guide wheel exhibiting differential tilt between the set screw axes.
Figure 5C:
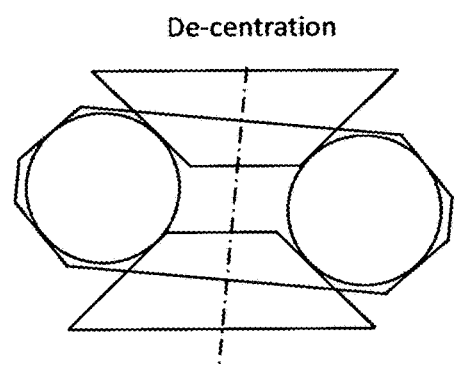
FIG. 5C is a cross-sectional diagram of the roller guide wheel exhibiting de-centration between the set screw axes.
Figure 5D:
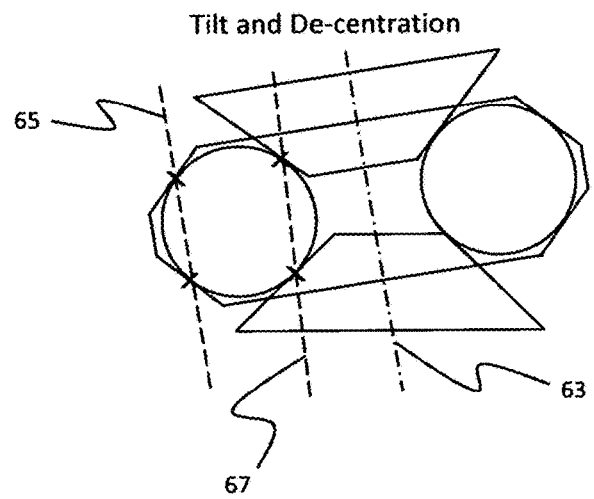
FIG. 5D is a cross-sectional diagram of the roller guide wheel exhibiting a combination of differential tilt and de-centration between the set screw axes.
Figure 5E:
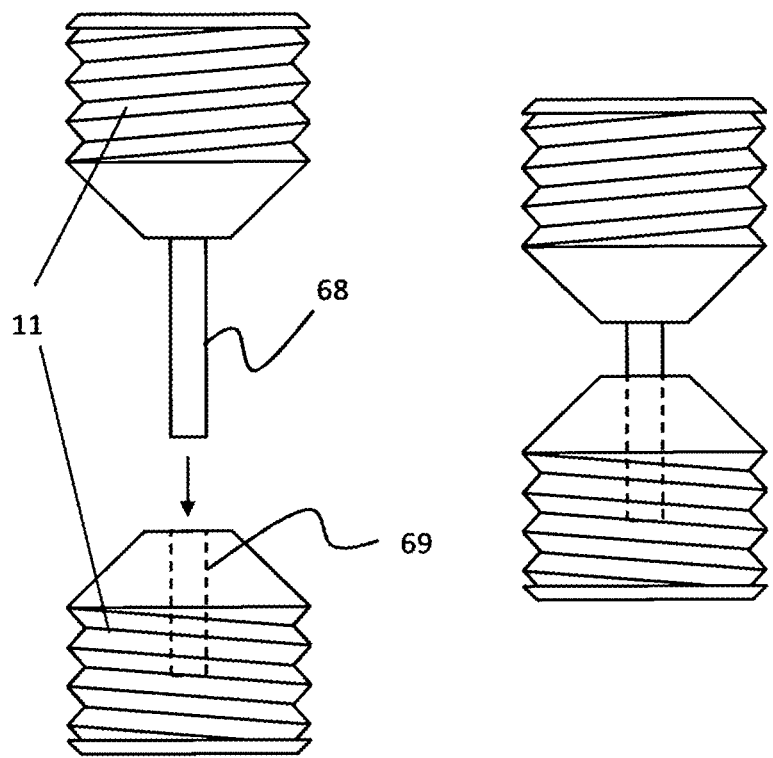
FIG. 5E is a cross-sectional diagram of set screws with a male and female alignment feature.
Figure 5F:
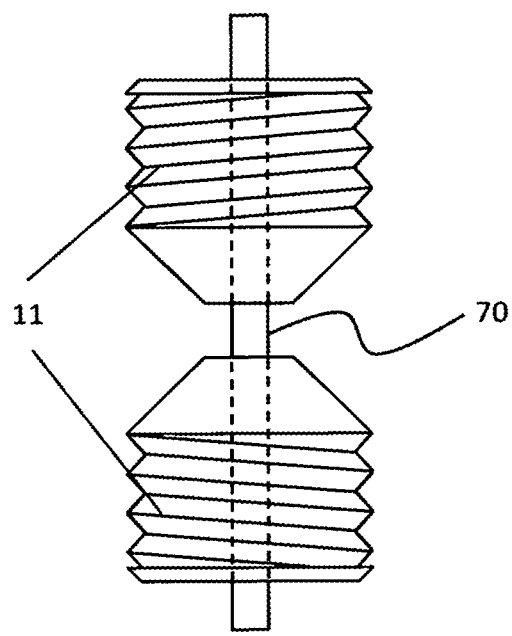
FIG. 5F is a cross-sectional diagram of set screws with a coaxial alignment mandrel.

With this four-point bearing construction, the conical surfaces 13 of FIG. 2B can exhibit some misalignment and still force the bearings 9 to make proper contact with the precision outer race 7 and result in a fixed plane of rotation. FIGS. 5B through 5D depict the effect on orientation of the wheel rotation axis of a departure from the aligned condition of FIG. 5A. A differential tilt between the axes of two set screws is shown in FIG. 5B. De-centration of the two set screw axes is shown in FIG. 5C and the combination of tilt and de-centration is shown in FIG. 5D. Also in this figure, it may be observed that line 65 between contact points on the outer race is parallel to the axis or rotation 63, whereas the line 67 between contact points on the inner race is not. Hence, some amount of sliding friction can occur. However, the magnitude of displacements depicted in these figures is exaggerated for ease of viewing. In the implemented roller wheel, these displacements will be minute owing to finite machining tolerances and lead to a small, fixed angular offset of the roller wheel axis of rotation from precise vertical and a minute amount of sliding friction. Means of insuring no misalignment of the set screws 11 is portrayed in FIGS. 5E and 5F. A first approach, shown in FIG. 5E, shows one of the set screws 11 provided with a precision coaxial alignment extension 68 that fits a corresponding coaxial cylindrical cavity 69 in the other set screw. Alternatively, a coaxial mandrel 70 can be inserted in the coaxial bores of both set screws, shown in FIG. 5F.

The wheel axis of rotation will not exhibit nutation and therefore supports various precision motion applications despite fixed changes in positions of the points of contact with the rail that will occur in the presence of a small fixed tilt of the rotation axis. The departure of the rotation axis from true vertical is inconsequential to the operation of the disclosed linear stage designs as will be explained below; the orientation of the rotation axis is indeed stationary after adjustment of the bearing tensioning set screw(s). It is this feature of stationarity of axial orientation that maintains the accuracy of the roller wheel motion on its guide rail. The outer bearing race is a set of non-compliant surfaces. When the set screws are tightened to bring the conical inner race surfaces into tensioned contact with the bearings, the bearings are forced against the outer race surface which will define a constant plane of rotation for the bearings. This potentially, slightly tilted plane of rotation is established by bearing contacts on the inner race. A slight arbitrary tilt of the roller wheel can, in general, be decomposed into a tilt component about axes perpendicular (pitch) and parallel (roll) to the rail upon which the roller rides.

Figure 6A:
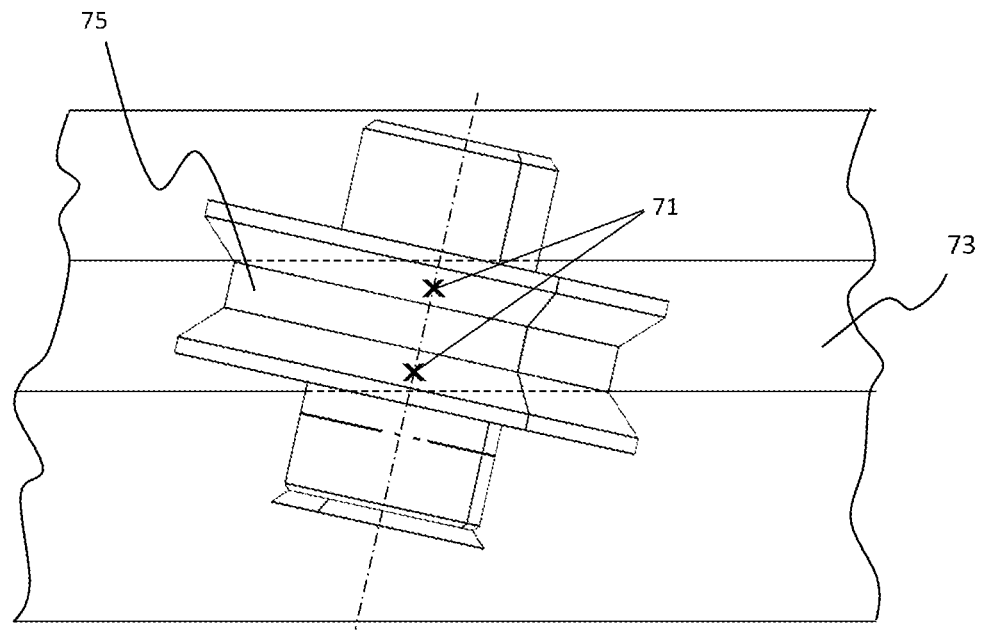
FIG. 6A is a cross-sectional diagram of pitch displacement between the precision roller guide wheel and its supporting rail.
Figure 6B:
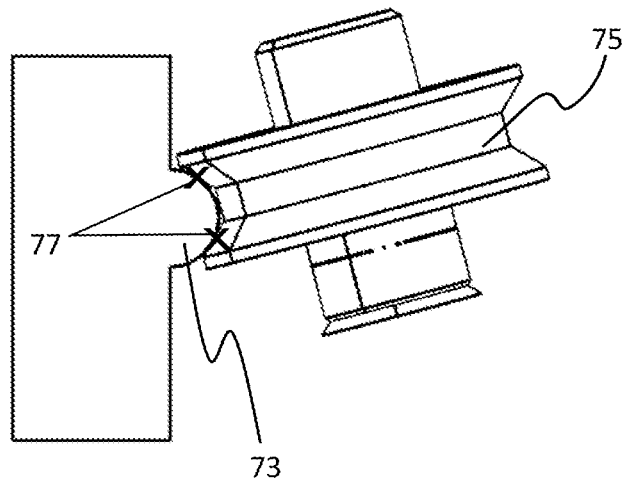
FIG. 6B is a cross-sectional diagram of roll displacement between the precision roller guide wheel and its supporting rail.

In FIG. 6A, it may be observed that a pitch angle will cause the two points 71 of wheel contact with the rail 73 to deviate from vertical alignment and alter the linear separation between the two points of contact 71. This will slightly alter the preload of the rail 73 against the wheel, given a stage flexure preload discussed below. As shown in FIG. 6B, a roll angle will cause the two points 77 of wheel 75 contact with the rail 73 to be displaced circumferentially about the axis of the rail 73. Combination of pitch and roll will result in combination of both of these effects. In any event, such systematic contact point offsets will not affect the precision motion performance of a linear stage using this guide wheel as it is constrained to translate with respect to the rigid primary rail reference geometry as described below.

Embodiments of Slider with a Single Roller Guide Wheel

The presently-disclosed device is a low profile linear positioning stage in manual and motorized embodiments with a slider that exploits multi-point contacts to achieve kinematic constraints. The stage is designed with certain locations of controlled compliance between parts in order to create forces between elements that are self-equalizing and thereby result in a semi-kinematic structure exhibiting precision linear translation of the slider.

A low profile stage is achieved through use of v-grooved frictional contacts of limited dimension sliding on a first rail on one side of the stage slider and a single guide wheel rolling along a second rail on the opposing side of the stage slider. Two main stage embodiments are disclosed, one in which the drive motor axis is parallel to the lead screw and mounted under the slider, the second in which the drive motor is mounted at one end of the stage perpendicular to the lead screw in order to permit a substantial through-hole in the slider and stage body. In the latter embodiment, extreme offset of the lead screw away from the longitudinal centerline of the stage also is required to achieve a large through-hole. In both embodiments, the use of the roller guide wheel insures that the preload can be increased with little or no consequence to drag force. With inclusion of the rolling contact approach, only one roller is needed to get the drag down to where it's tolerable.

Figure 7:
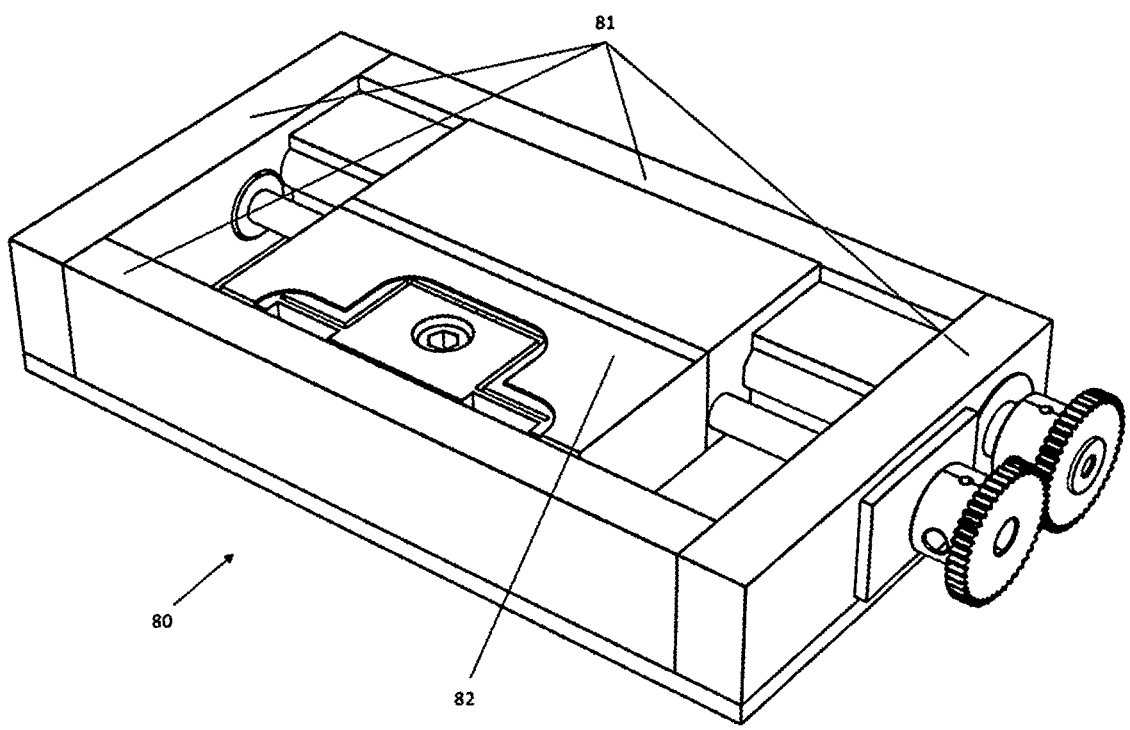
FIG. 7 is a pictorial diagram of an embodiment of a low profile stage using the precision roller guide wheel.
Figure 8:
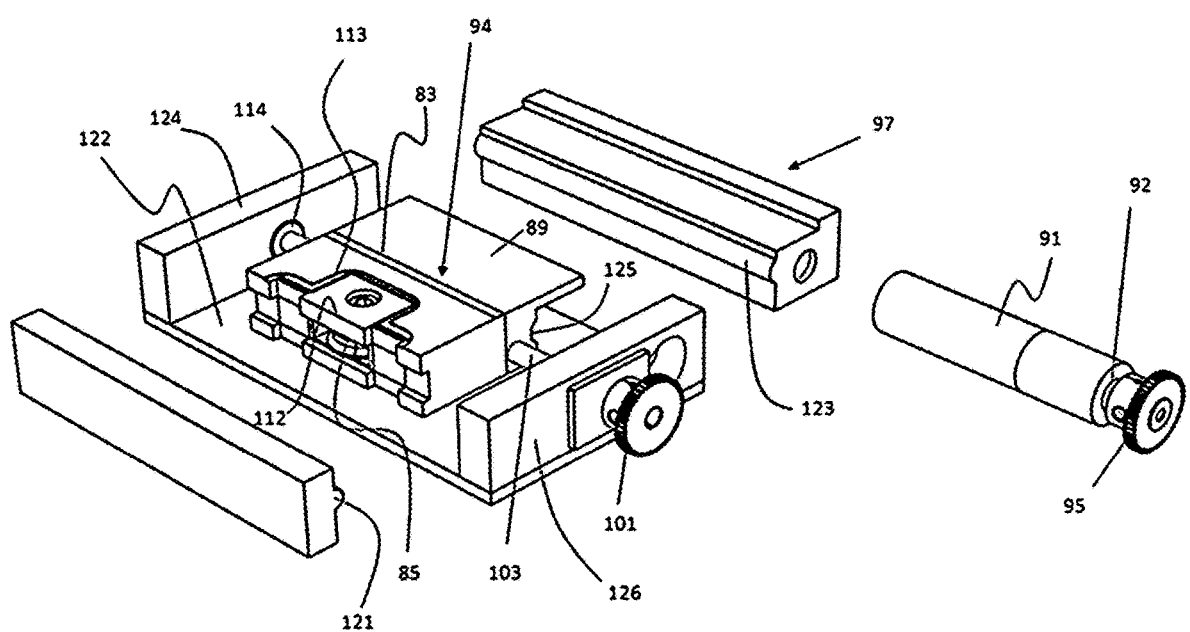
FIG. 8 is an exploded pictorial diagram of a low profile stage using the precision roller guide wheel.
Figure 9:
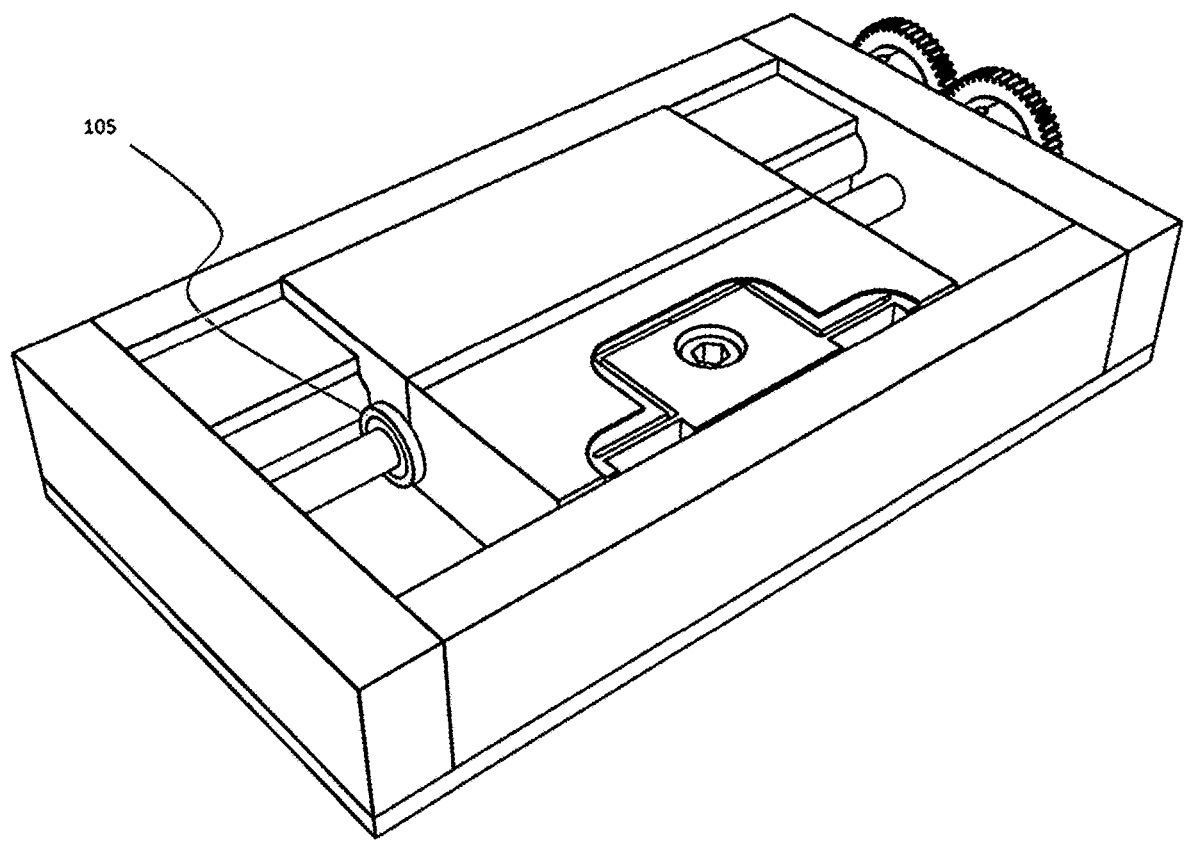
FIG. 9 is a pictorial diagram of an embodiment of a low profile stage using the precision roller guide wheel, highlighting the stage slider nut.
Figure 10:
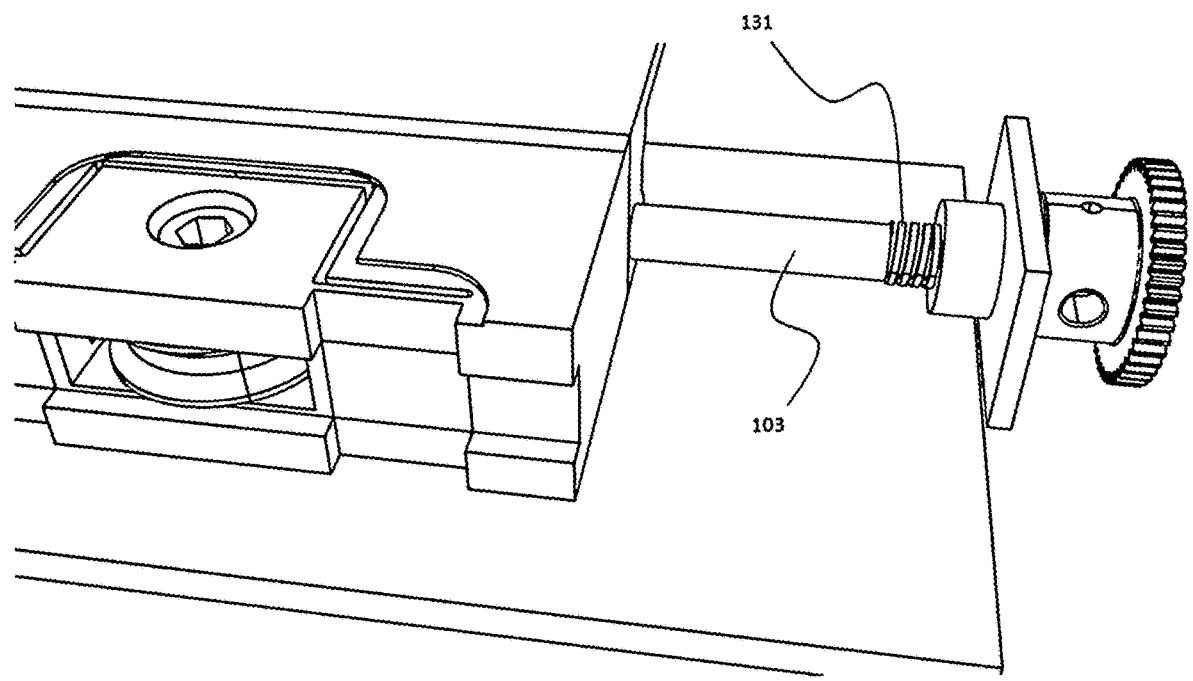
FIG. 10 is a pictorial diagram of an embodiment of a low profile stage using the precision roller guide wheel, highlighting the lead screw preload.

FIG. 7 provides a perspective view of a motorized version of the stage 80. In the exploded diagram of FIG. 8, the primary components are featured. The stage body 81 comprises the primary rail assembly and motor compartment 97, the secondary integrated rail/assembly 121, the stage base 122, and stage ends 124 and 126. The integrated rails 121 and 123 are machined into each side of the stage body and therefore exhibit increased stiffness and reduced compliance. This is important as the primary rail acts as the reference surface for precision motion of the stage slider 83. The motor 91 is contained within the motor compartment 97 in order to reduce the form factor of the stage 80. At the proximal end of the stage, its gearhead 95 is mounted on the shaft 92 protruding through one stage end 126. Gearhead 101 is similarly mounted at the stage end 126. A lead screw 103 is affixed at one end to gearhead 101 and at the opposing, distal end of the stage is seated in a receiving socket 114 in stage end 124. Gearheads 95 and 101 are enmeshed so that activation of motor 91 causes rotation of lead screw 103. The stage slider 83 is depicted with a mounting surface 94 exhibiting an area of extension 89 that overhangs the primary rail 123 and motor compartment 97. This provides increased mounting surface area and loading capacity. Linear motion of the slider 83 occurs as the lead screw 103 turns through a nut 105 contained in the slider 83 shown in FIG. 9. The lead screw 103 is preloaded against its receiving socket 114 by a spring 131 shown in FIG. 10. Again, with reference to FIG. 8, it may be seen that in this embodiment, the slider 83 exhibits two different way mechanisms on respective sides of the slider. On one side the slider 83, the roller guide wheel 85 contained in the slider 83 and which rides on secondary rail 121, is circumscribed by a cutout the full vertical thickness of the slider 83 that forms a flexure 113. This cutout permits a flexure structure with a spring rate conducive to lateral preloading of the slider against the secondary rail 121.

The guide wheel 85 is located at the longitudinal center of the slider so that the preload force transmitted by the secondary rail 121 induces no yaw moment to the slider 83. The slight amount of rolling drag of the guide wheel 85 counteracts the drag-induced yaw moments of the primary rail 123 contacts with the slider 83.

The other side of slider 83 exhibits a truncated v-groove 125 that makes sliding contact with the primary rail 123. The slider 83 maintains sliding contact with a primary rail 123 on one side and rolling contact with a secondary rail 121 on the other side by virtue of preload of the secondary rail 121 against the roller guide wheel 85 accommodated by flexure 113.

For motion control, kinematic designs emphasize the use of carefully selected single point contacts to constrain unwanted degrees of freedom. When properly chosen, such designs constrain one degree of freedom for each point of contact. In most cases, kinematic designs require a biasing force or preload to keep all points in contact; in addition, sliding friction can be replaced with rolling friction through the use of balls as contact points. Such designs are the "purest" in their adherence to mechanical design principals, however the small number of contact points results in a low load bearing capacity. Kinematic way designs stand at one end of a spectrum that extends to area-averaging ways (such a dovetail ways) at the other extreme. Various trade-offs occur as one moves along the spectrum from kinematic to "elastic averaging". Elastic averaging is a technique for mechanical coupling that achieves improved accuracy by the averaging of errors over a large number (redundant number) of relatively compliant contacting members. In essence, this occurs when substituting point contacts with area contacts. Hence, in certain distributed-compliance flexure mechanism geometries, the errors associated with departure from true kinematic geometry are mitigated by the phenomenon of elastic averaging and over constraint can be accommodated by distributed compliance.

Kinematic ways offer the highest possible fidelity in reproducing the intrinsic geometric accuracy of the way surface (typically, composed of flats and/or cylinders, in the disclosed device, the preferred structure is a cylindrical rail). They do so with no possible transmission of strain due, for example, to thermal expansion (Dover Motion: http://dovermotion.com/positioning-systems-overview/). In the case of precision linear stages, a semi-kinematic design, as disclosed herein, permits area contacts, preload flexures, and, to some extent, elastic averaging across the structure.

Figure 11A:
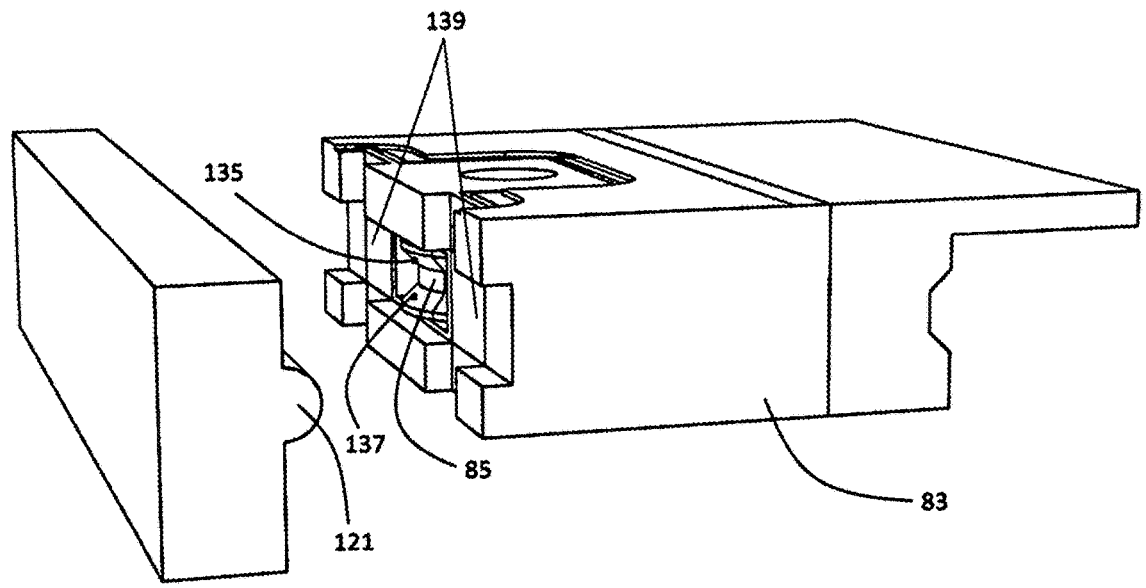
FIG. 11A is a first pictorial diagram highlighting the points of rolling contact between the precision roller guide wheel and its support rail.
Figure 11B:
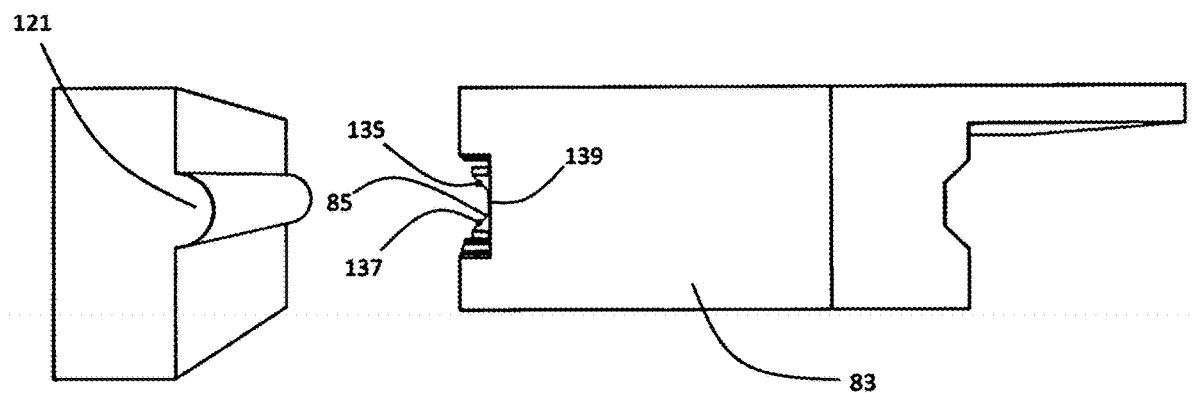
FIG. 11B is a second pictorial diagram highlighting the points of rolling contact between the precision roller guide wheel and its support rail.
Figure 12:
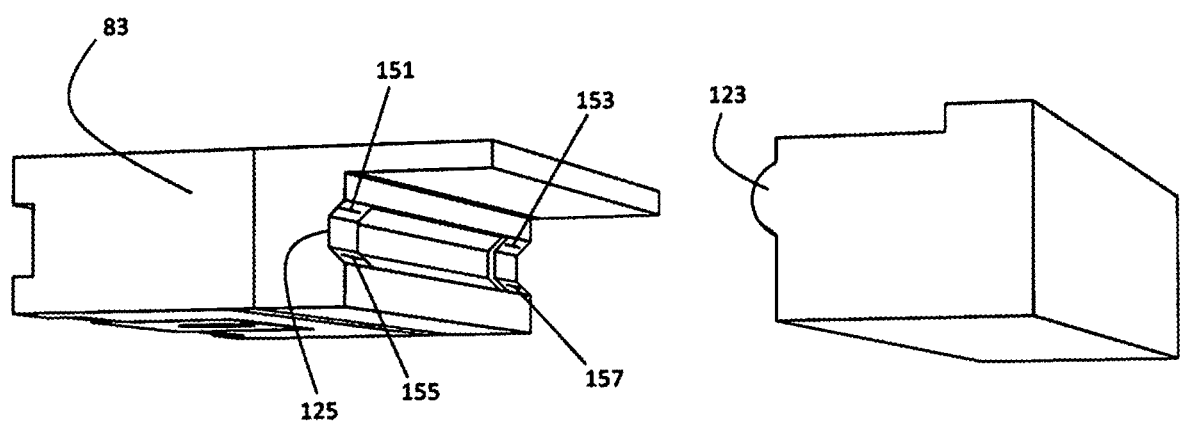
FIG. 12 is a pictorial diagram of the stage slider depicting the linear regions of sliding contact with the primary rail.

FIGS. 11A, 11B, and 12 depict the approximation to kinematic ways used in the present device. With reference to FIGS. 11A and 11B depicting the complimentary geometry of the slider 83 and secondary rail 121, the secondary rail 121 is seen to contact only two regions 135 and 137 of the roller guide wheel 85. The slider cutout 139 is laterally recessed from these contact regions 135 and 137 to insure that the secondary rail 121 makes contact only with the roller guide wheel 85. FIG. 12 depicts the truncated v-groove 125 of the slider 83 that rides on the primary rail 123. It is to be understood that a preferred rail cross-sectional shape is circular in nature, but any number of curvilinear shapes are within the scope of the disclosed device. The truncated v-groove 125 is recessed resulting in an upper set of short line contacts 151 and 153 with the rail 123 and a lower set of short line contacts 155 and 157 with the rail 123. These limited contact regions diminish the amount of friction present. Given the collinearity of contacts 151 and 153 and the collinearity of contacts 155 and 157, the contact geometry of both short segments approximates two extended line contacts with the primary rail. Each line contact provides two kinematic constraints, a normal reaction force and a moment reaction resulting in a total of four kinematic constraints along the primary rail 123. Hence, two remaining degrees of freedom comprise axial translation and roll rotation about the rail 123. The roller guide wheel 85 on the opposing side of the slider 83 constrains roll rotation and permits only axial translation as the remaining degree of freedom. The use of a roller for the final points of contact permits the use of higher preload of the slider against the guide rails without increase in drag force. However, the roller must exhibit very high motion accuracy, free of eccentricity, planar shift, and angular deviation of its rotation axis. The roller disclosed herein meets these objectives and offers a simple and inexpensive approach to creating the precision rolling contact necessary for stages and other applications.

Figure 13:
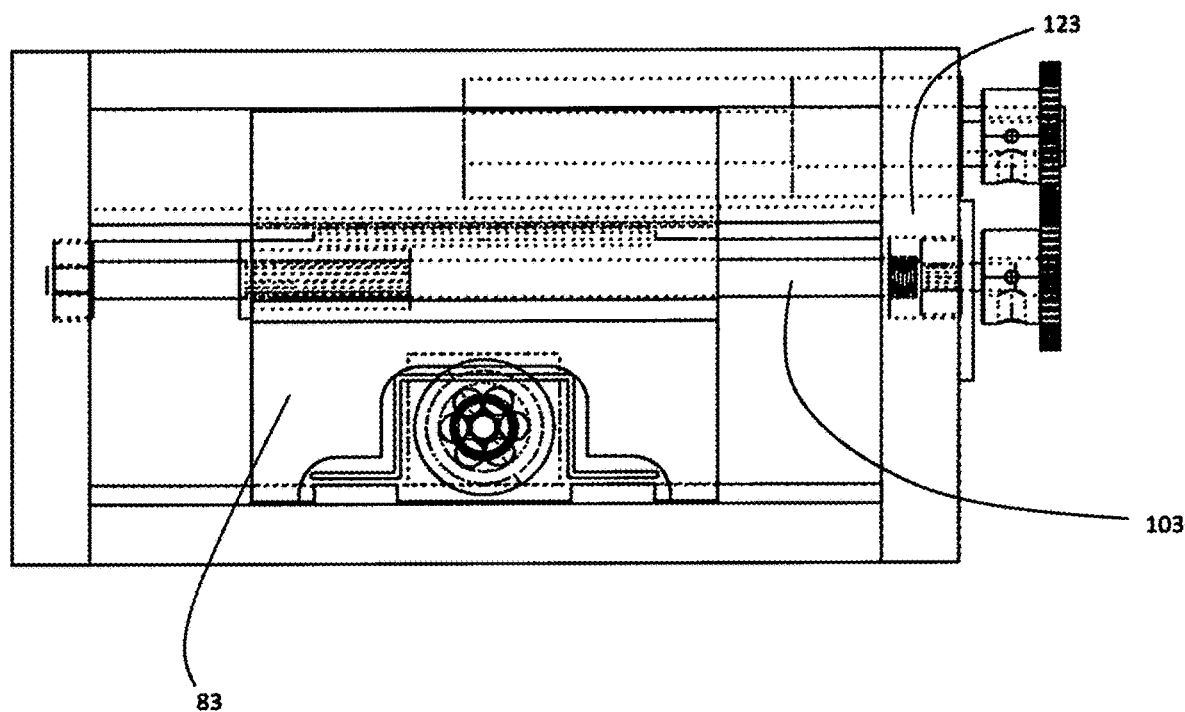
FIG. 13 is a plan schematic diagram of an embodiment of the low profile stage using the precision roller guide wheel, depicting proximity of the lead screw to the primary rail.

In the preferred embodiment, as stated, the low profile for the stage 80 is facilitated by a slider 83 that employs a truncated v-groove 125 riding on a primary rail 121 and a thin roller guide wheel 85 riding on a secondary rail 121. This obviates the spatial extent and cost of hardware associated with other means of sliding support including ball bearings and crossed roller bearings. The lead screw 103 which propels the slider 83 is laterally offset in the stage and is in proximity to the main slider rail 123 as shown in FIG. 13. This reduces any unwanted yaw moments associated with slider 83 contacts on the primary rail 123. In another embodiment of the device, the motor 91 also can be in proximity to the lead screw 103 facilitating a more efficient drive train.

The use of the single roller guide wheel 85 as the rolling support on the secondary rail 121 permits a reduction in drag otherwise associated with a sliding contact, it offsets the moment forces of the primary rail 123 frictional contacts, and it allows much greater preloading of the slider 83 against the rails 121 and 123 without incurring additional drag, thereby providing greater functional moment loads on the slider 83 when in use. The roller guide wheel 85 for this and other embodiments of the linear positioning device is of a special design the exhibits a stationary axis of rotation in the presence of mounting set screw misalignments, important in the maintenance of slider motion accuracy. In manual versions of the stage, the motor and motor compartment are absent. Gearing may or may not be present to transfer torque to the lead screw by manual rotation of a thumbwheel or other actuation device at the end of the stage. The materials favored for the construction of the stage are those that are hard and can sustain machining to adequate tolerances. This would include metals and alloy metals such as aluminum and stainless steels with or without anodized coatings.

Preload Flexures

In contrast to flexures used as actuation mechanisms, the flexures used in the presently disclosed device serve to accommodate a preload that encourages kinematic behavior of the stage by maintaining contacts among the various way surfaces. In preferred embodiments, the flexure is made part of the stage slider so it may elastically comply with the rigid reference rails of the stage body. However, in alternate embodiments, as discussed below, wherein the reference rail is made part of the slider, the stage body can exhibit complimentary compliance and therefore the flexure can be made part of the stage body.

Figure 14A:
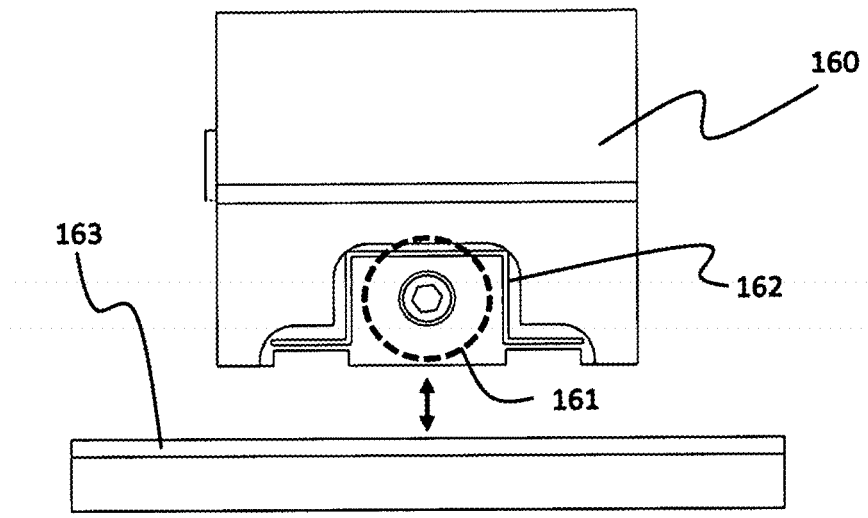
FIG. 14A is a schematic diagram of the slider and secondary rail illustrating preload geometry.
Figure 14B:
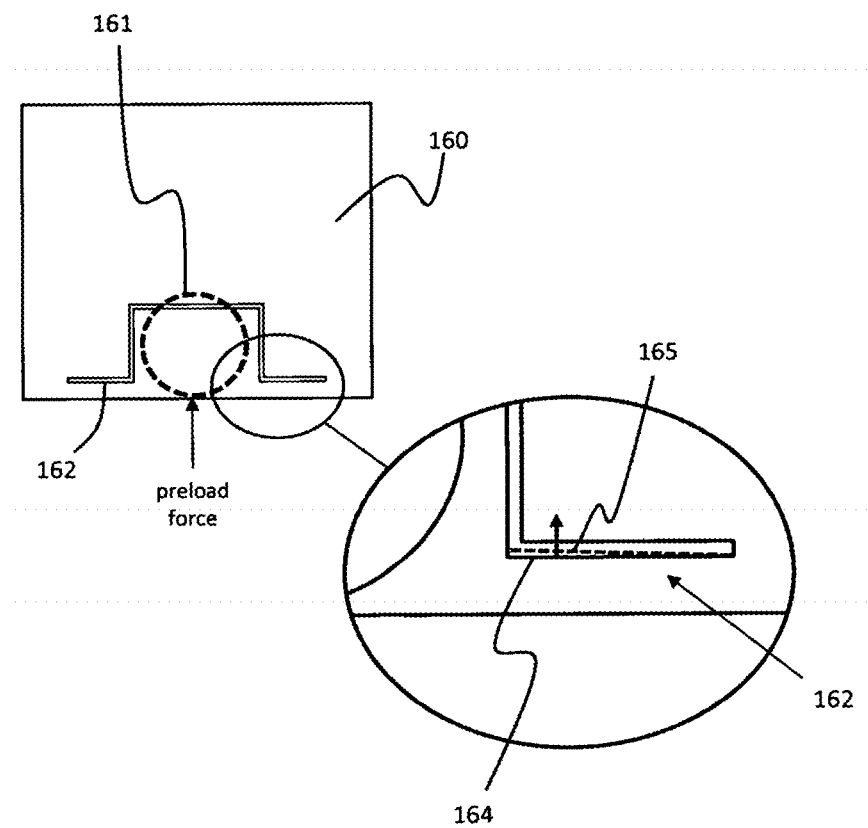
FIG. 14B is a magnified schematic diagram of flexure distortion under preload.
Figure 14C:
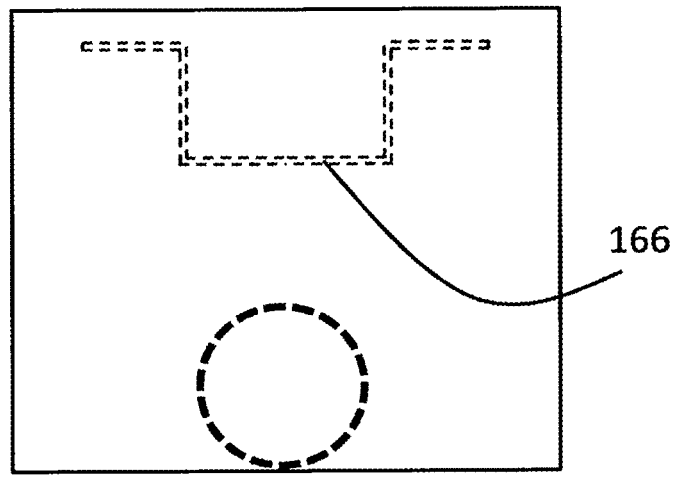
FIG. 14C is a schematic diagram of flexure placement on an opposing side of the slider.
Figure 14D:
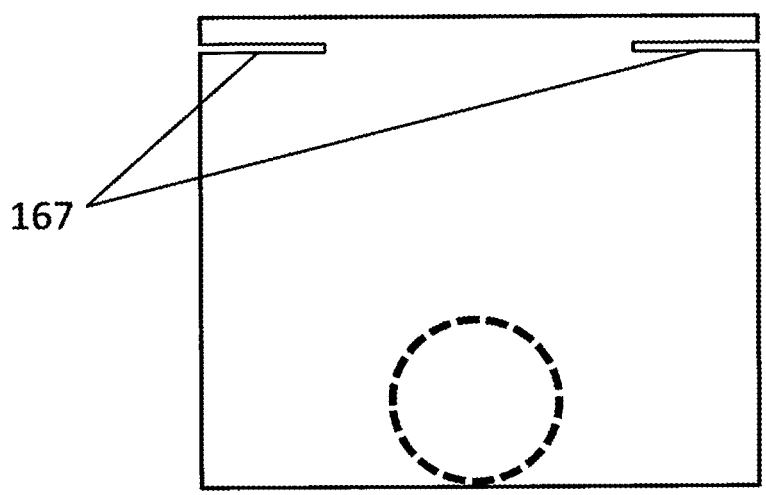
FIG. 14D is a schematic diagram of an alternate flexure geometry.

In the example shown in FIG. 14A, the secondary rail 163 is forced into contact with the roller guide wheel 161 mounted in slider 160 to impart a preload that places the slider flexure 162 under tension. In the expanded diagram of FIG. 4B, the preload tension causes an elastic deformation of the flexure 162. A major component of this deformation comprises motion of surface 164 inward to a new position 165. The position(s) and shapes of one or more such flexures can vary depending on design details for various embodiments, such as desired spring rates, the spatial extent of elastic deformation, linearity of spring behavior, etc. For example, FIG. 4C depicts placement of the flexure 166 on a side of the slider opposing the roller guide wheel and FIG. 4D depicts the use of a set of slits comprising a flexure 167 placed near this edge of the slider. Flexures can be EDM wire cut or machined into the slider or stage body in various ways well-known in the prior art. In the case of placement of the flexure in the slider, the flexure typically would be cut through the full thickness of the slider.

Side Drive Embodiment

Figure 15:
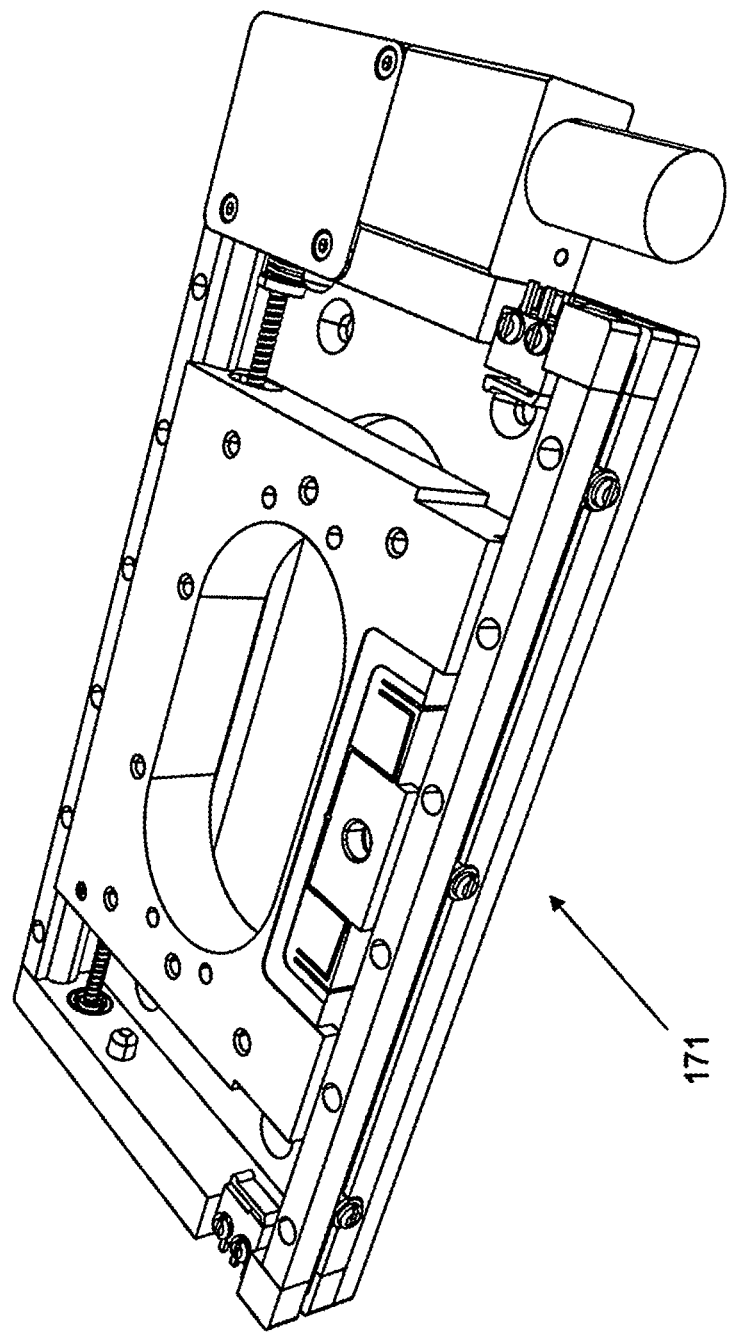
FIG. 15 is a pictorial diagram of a side drive embodiment of the stage.
Figure 16:
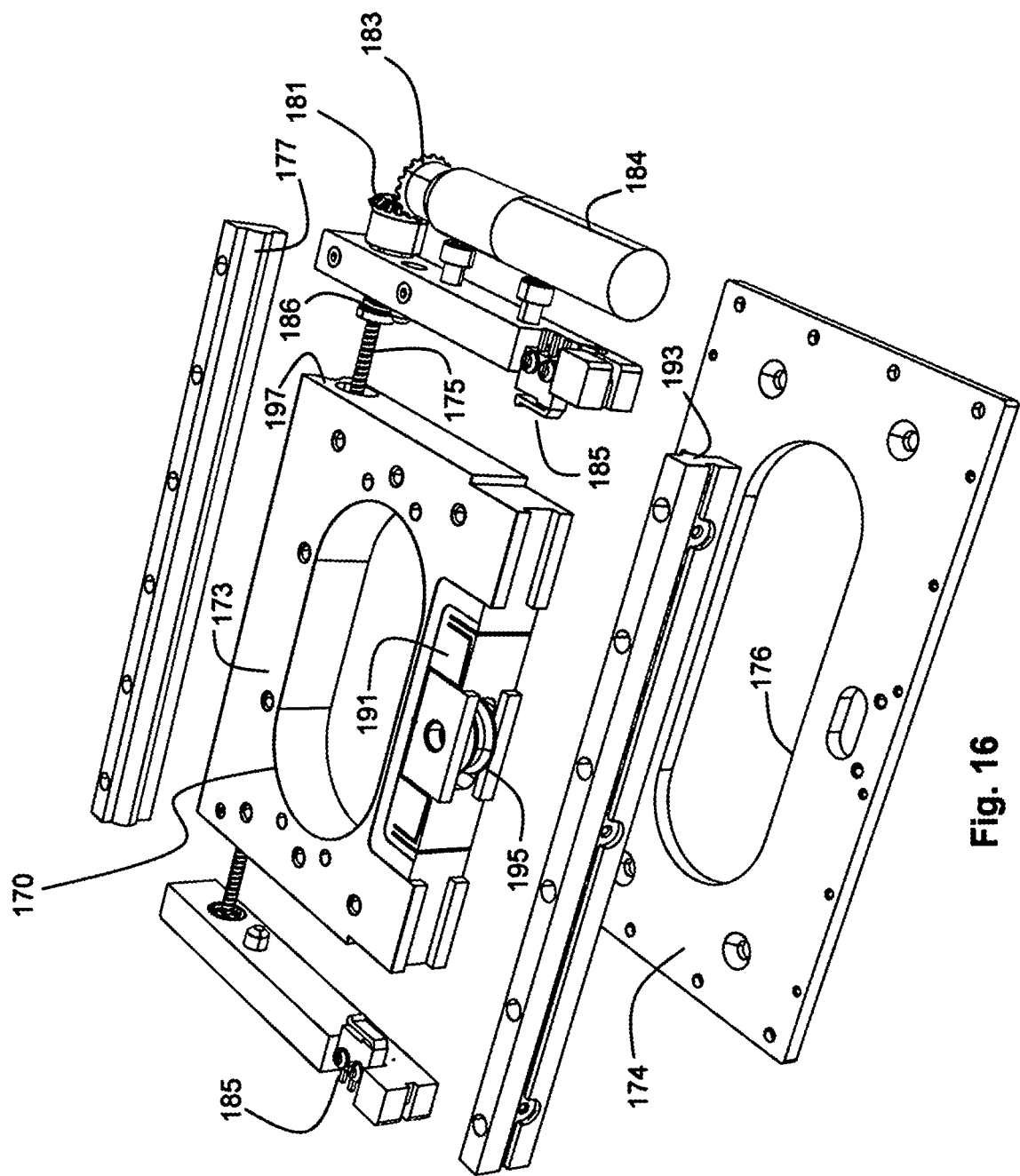
FIG. 16 is an exploded diagram of the side drive embodiment of the stage.
Figure 17:
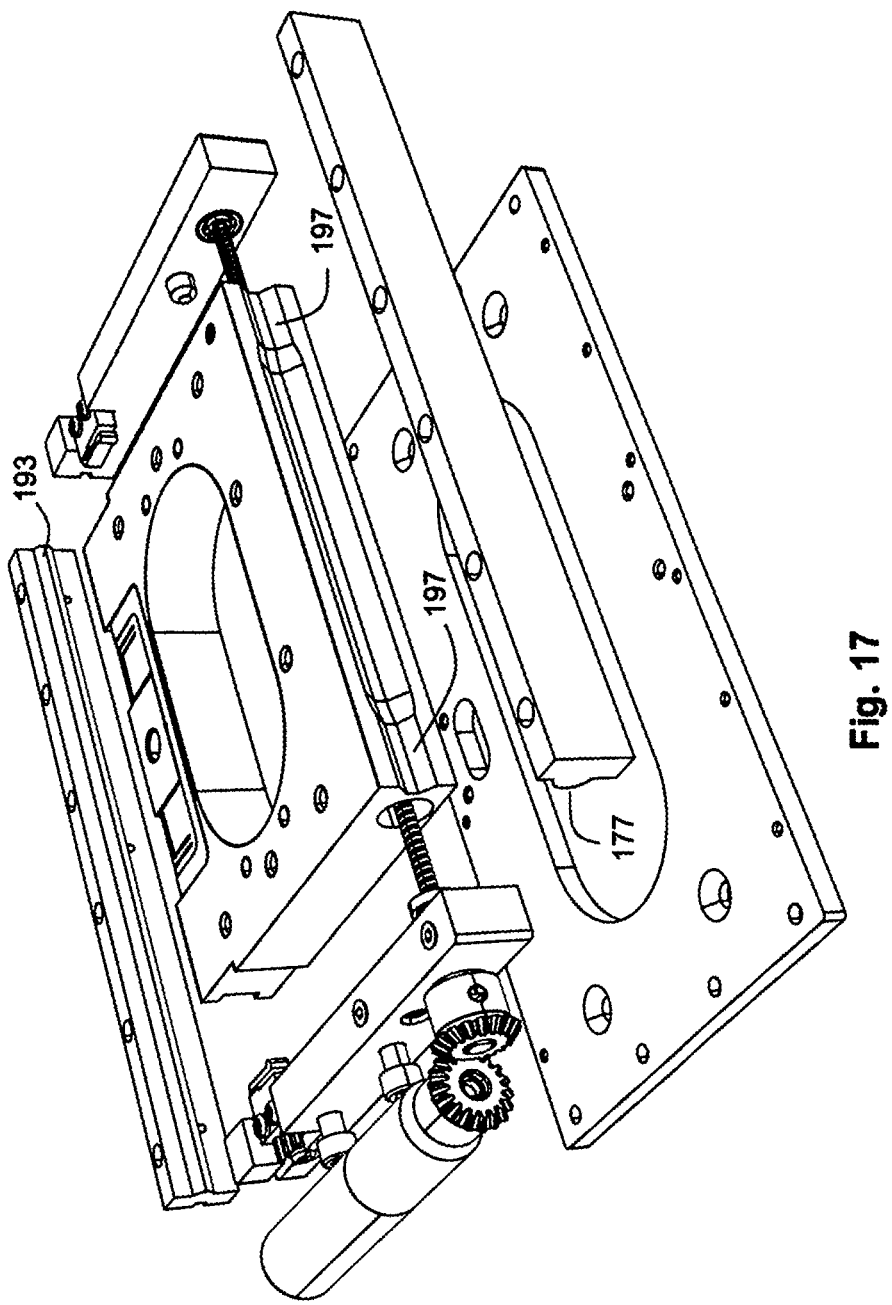
FIG. 17 is an exploded diagram of the side drive embodiment of the stage providing an enhanced view of the primary rail contacts.
Figure 18:
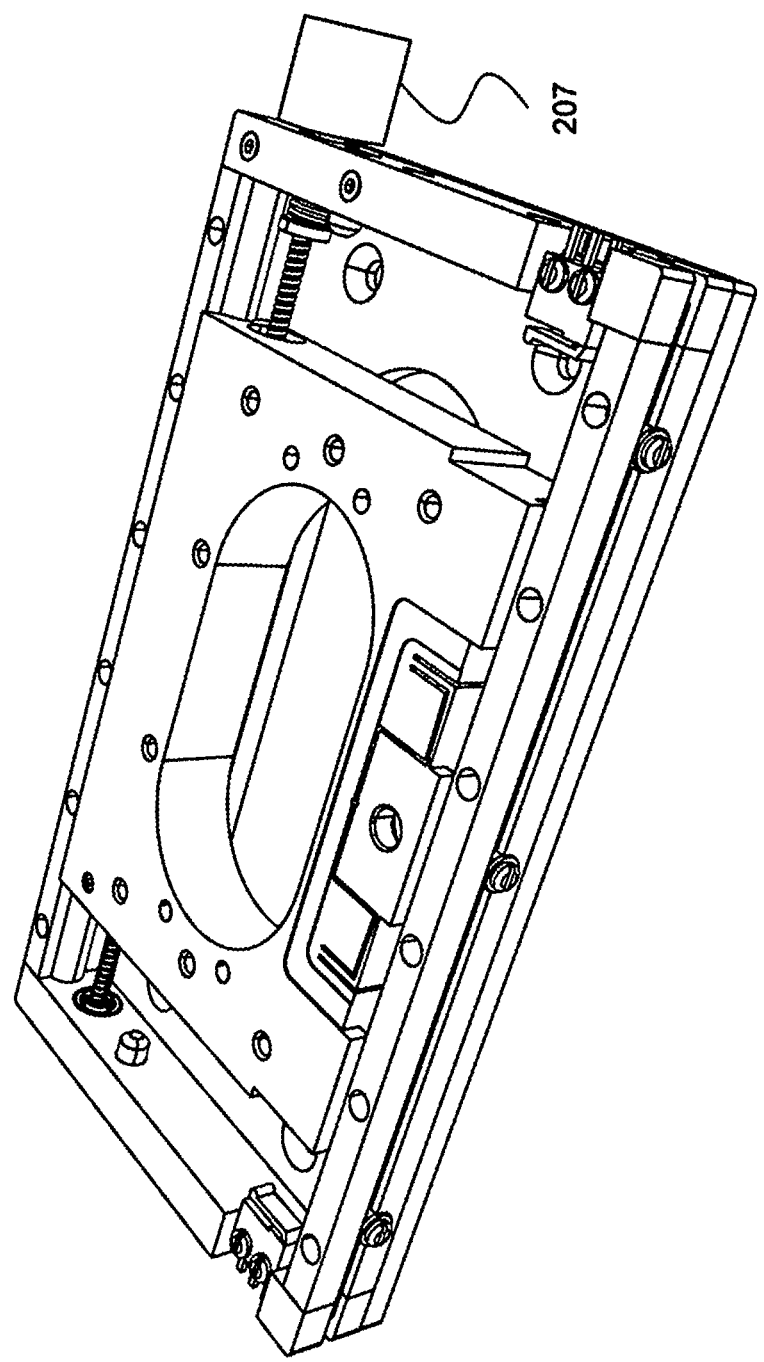
FIG. 18 is a pictorial diagram of a manual version of the side drive stage.
Figure 19:
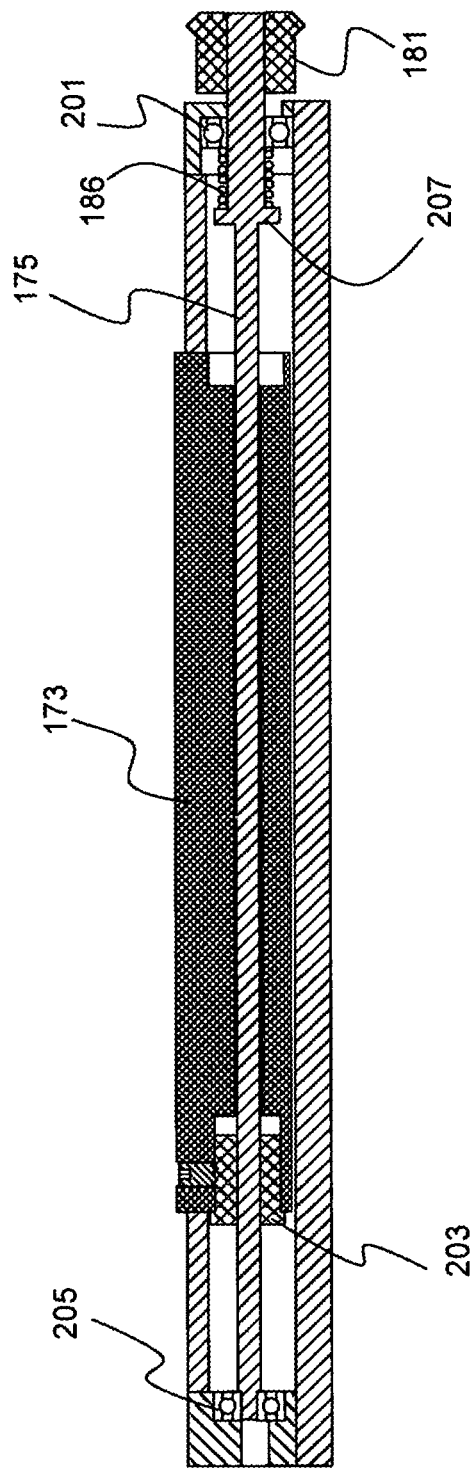
FIG. 19 is a cross-sectional diagram of the lead screw and associated hardware.
Figure 20:
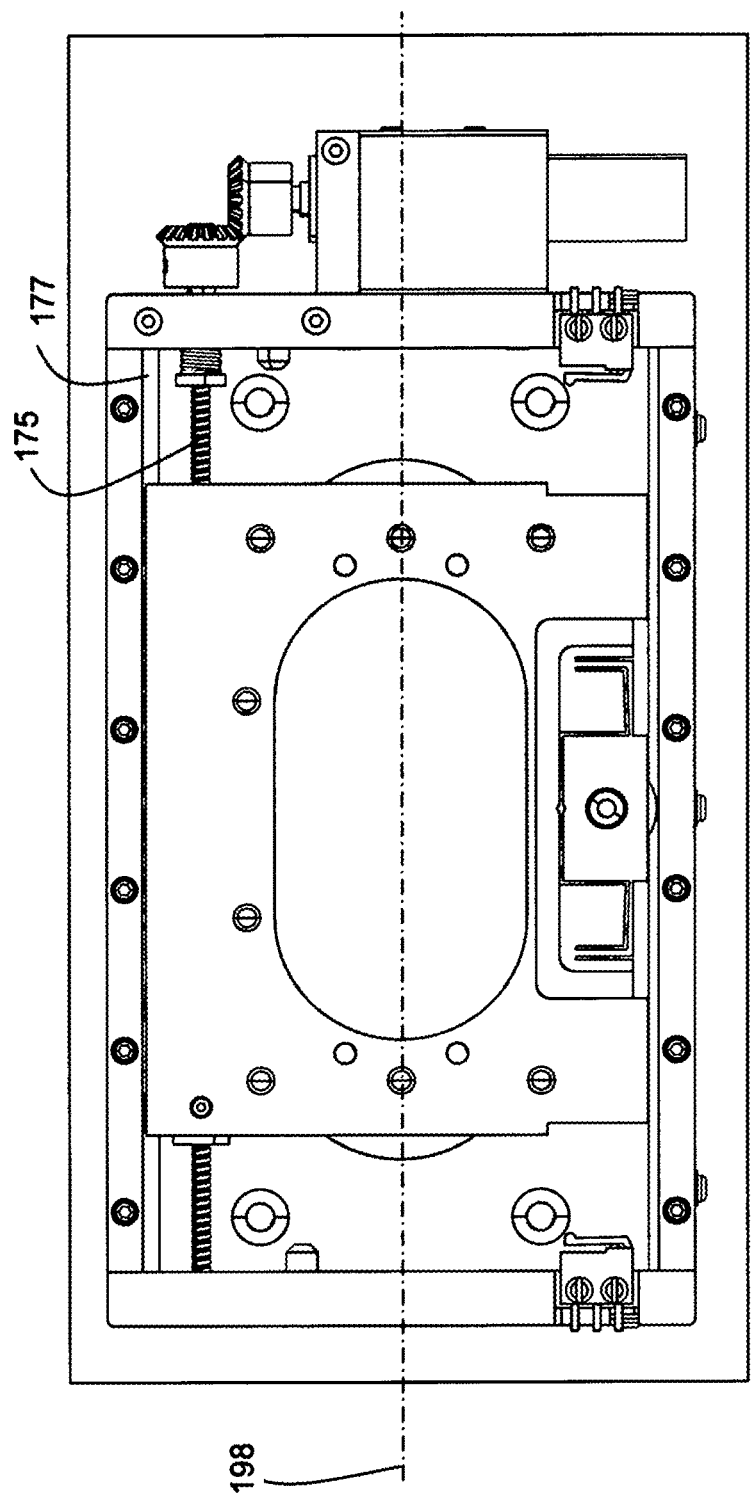
FIG. 20 is a plan view of the stage highlighting the nature of the motor side drive.

In various instrumentation, research, and even production applications, it is often advantageous for linear stages to offer through-holes in the stage slider to permit electromagnetic energy (light/lasers, RF and microwaves), acoustic energy (sound, ultrasound) fluids, or other mechanical objects to pass through the slider. A variation of the stage configuration that is low profile and exhibits a large through-hole is shown in the pictorial diagram of FIG. 15. Reference is made to the exploded diagram of FIG. 16. In order to provide a stage 171 with a large through-hole 170, the lead screw 175 is positioned extremely close to the primary rail 177 to one side of the stage 171. The stage body base 174 provides a over-sized through hole 176 to accommodate slider motion. To minimize the lateral extent of the stage 171, the motor (and potentially a motion encoder) 184 is placed at one end of the stage and its drive shaft is coupled through right angle bevel gears 183 and 181 to the lead screw 175. The primary rail 177 contacts regions of the truncated v-groove 197 (also shown in, FIG. 17) on the slider 173 and the secondary rail 193 makes contact with roller guide wheel 195. The lead screw 175 sustains a preload by virtue of spring 186, as will be discussed below. At manufacture, the roller guide wheel 195 is preloaded against secondary rail 197 by means of the flexure mechanism 191. Limit switches 185 disable the motor 184 when the slider moves proximate to either end of the stage body. FIG. 17 provides an improved view of the slider contacts 197 with primary rail 177. A manual version of the stage is depicted in FIG. 18 showing a thumb knob 207 for manual rotation of the lead screw. Alternatively, a micrometer head could be employed for this purpose. The details of the disposition of the lead screw 175 are provided in the cross-sectional diagram of FIG. 19. Gearhead 181 captivates the lead screw 175 at one end and in proximity to this, a first bearing set 201 supports the lead screw shaft. The lead screw 175 is shown traversing the body of the slider 173 and is threaded through the slider nut 203. The lead screw 175 is supported at the distal end by a second bearing set 205. Spring 186 is held in compression between the back surface of the first bearing set 201 and a flange 207 that is part of the lead screw 175. The lead screw 175 is thereby axially-preloaded. The plan view of the stage in FIG. 20 emphasizes the side-drive nature of the geometry by virtue of the remote placement of the lead screw 175 in relation to the center line of the stage 198 and its proximity to the primary rail 177. Because the lead screw 175 is located adjacent the primary (reference) rail 177 any shifting moment load upon slider motion reversal is virtually eliminated due to the "high-friction" rail seating. The roller guide wheel 195 on the opposing secondary (follower) rail 193 introduces virtually no drag and thus also does not cause shifting moment on reversal; this stage exhibits strong anti-abbe qualities by design.

Linear Motor Embodiment

Figure 21A:
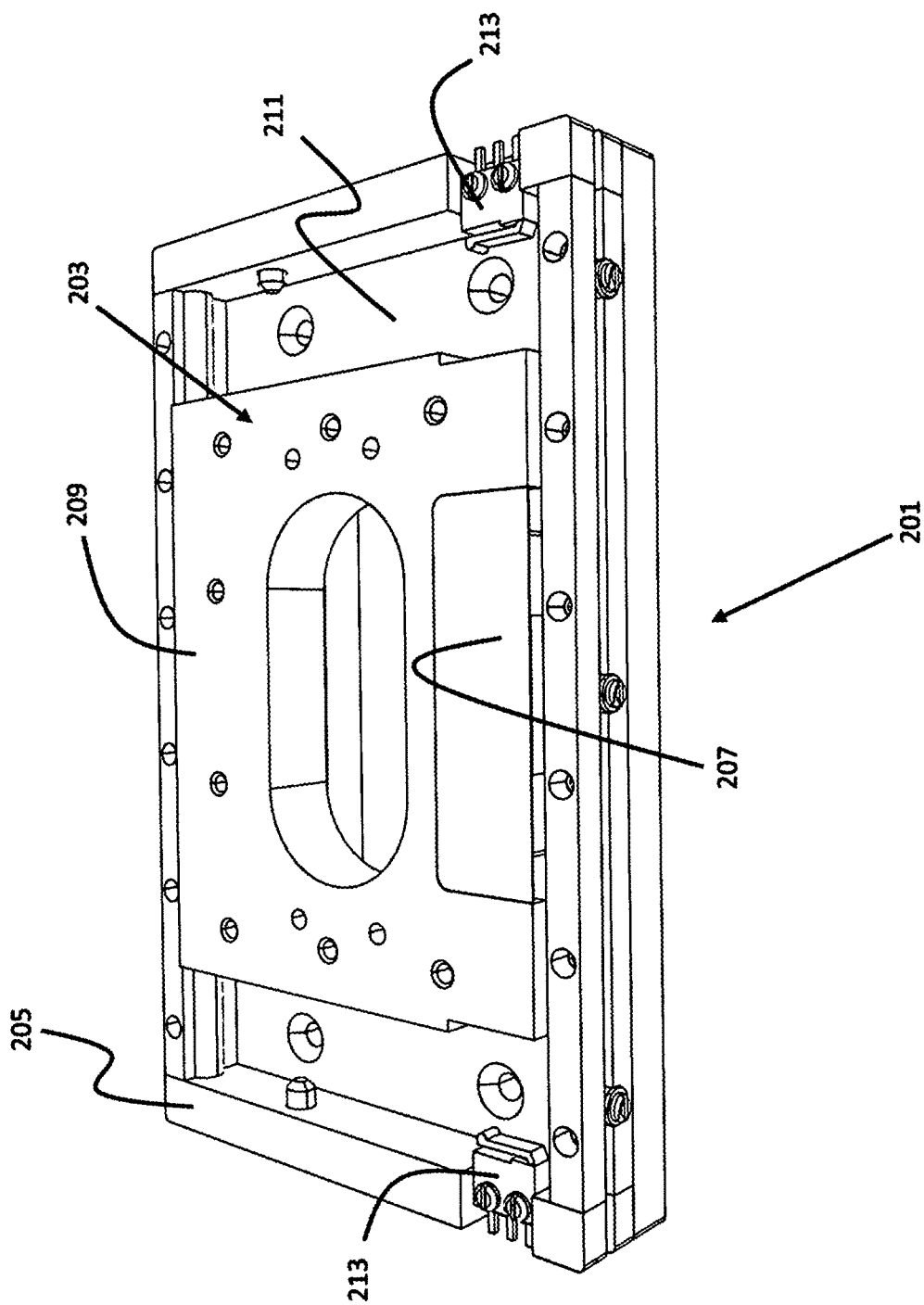
FIG. 21A is a top view of the side driven stage using a linear motor.
Figure 21B:
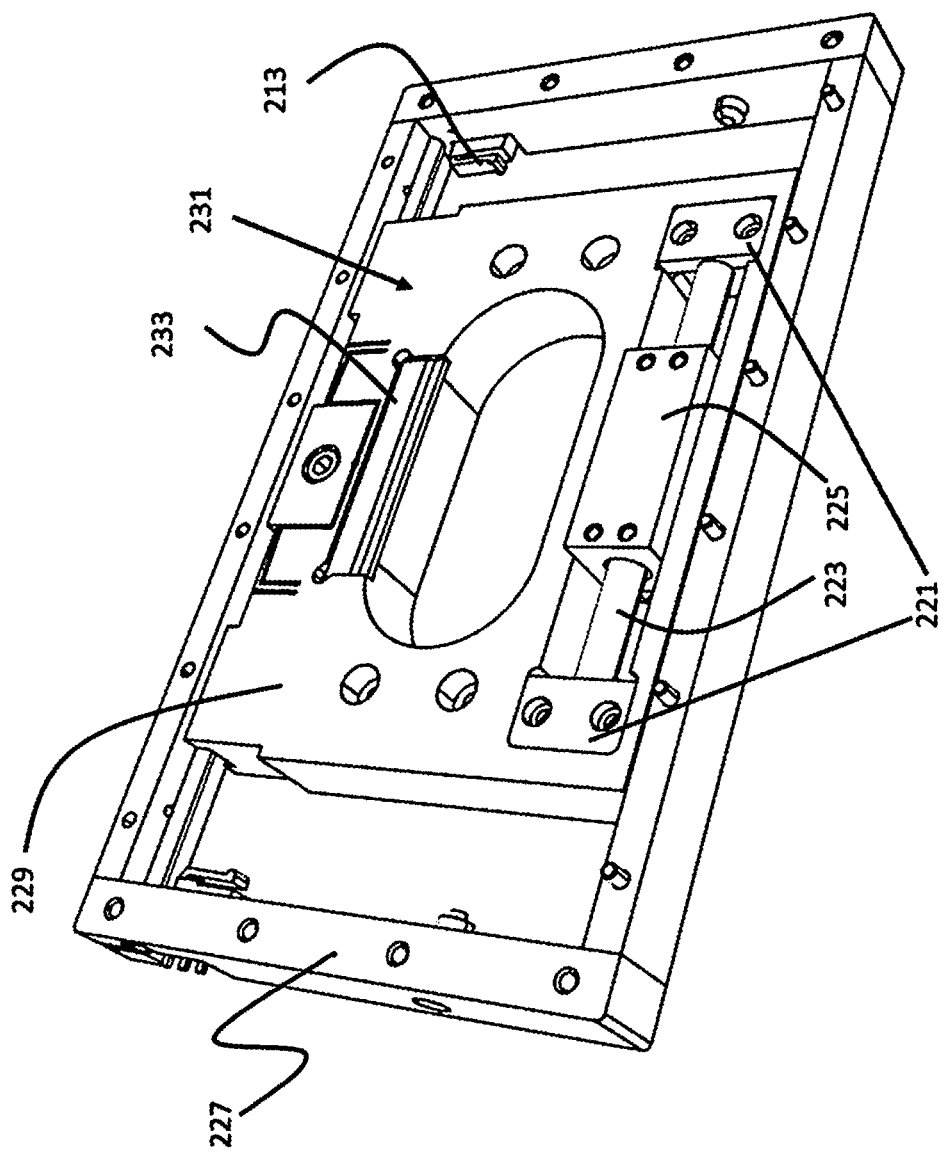
FIG. 21B is a bottom view of the stage slider showing location of the linear motor.
Figure 21C:
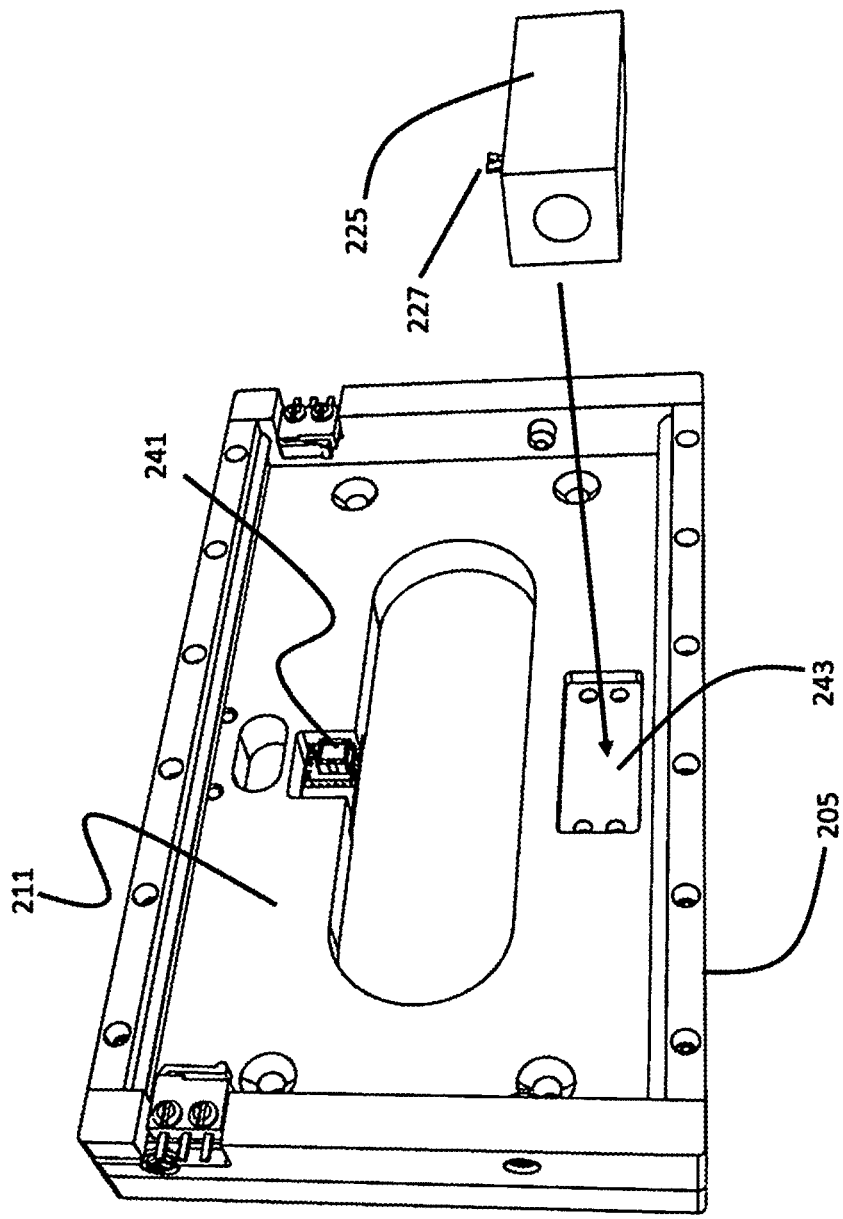
FIG. 21C is an exploded view of the stage body, motor forcer, and linear encoder sensor locations.
Figure 22A:
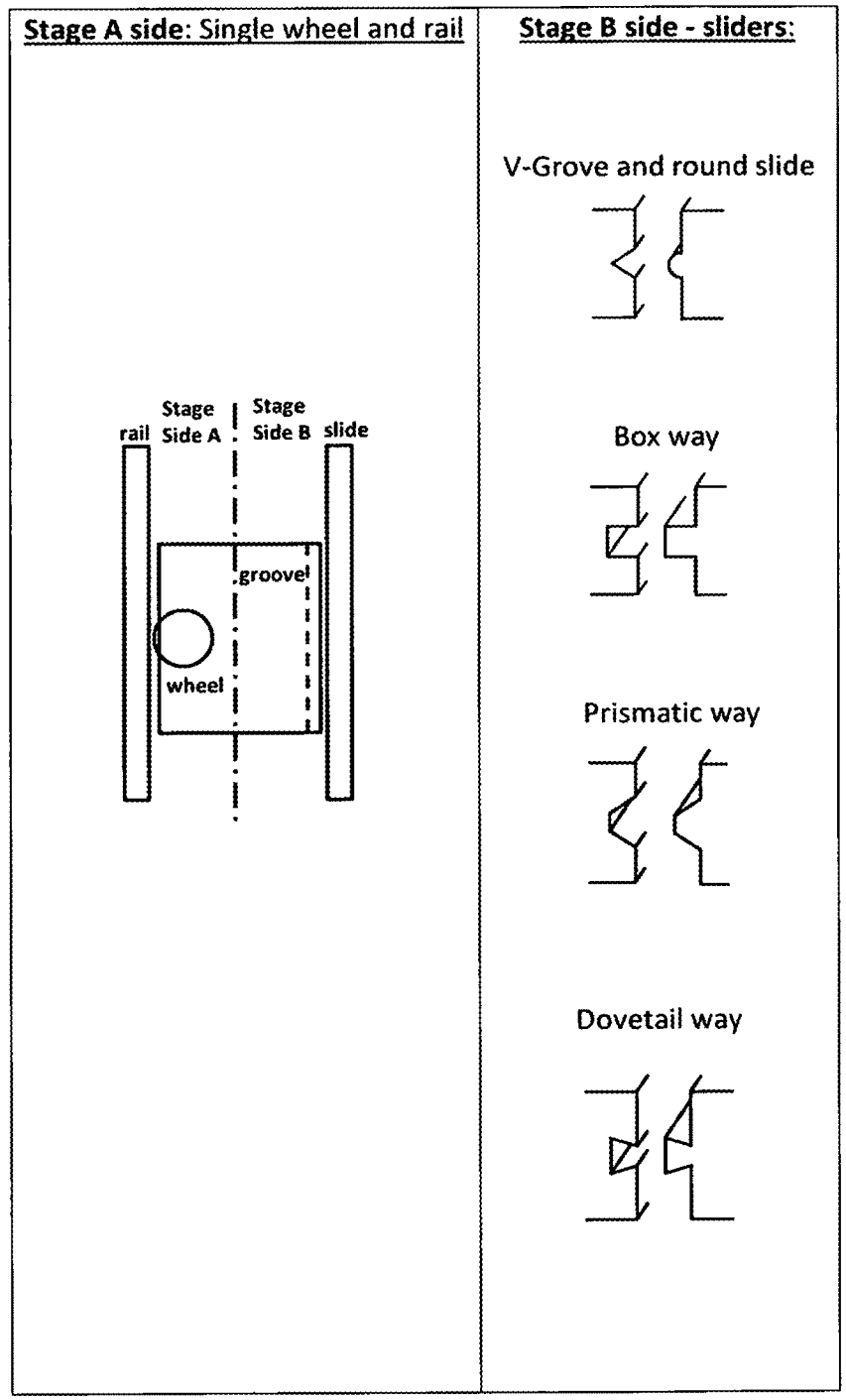
FIG. 22A is the first page of an option table, which is a tabulated pictorial taxonomy of stage roller and way combinations, showing a slider single wheel and rail for stage side A and various sliders for stage side B.
Figure 22B:
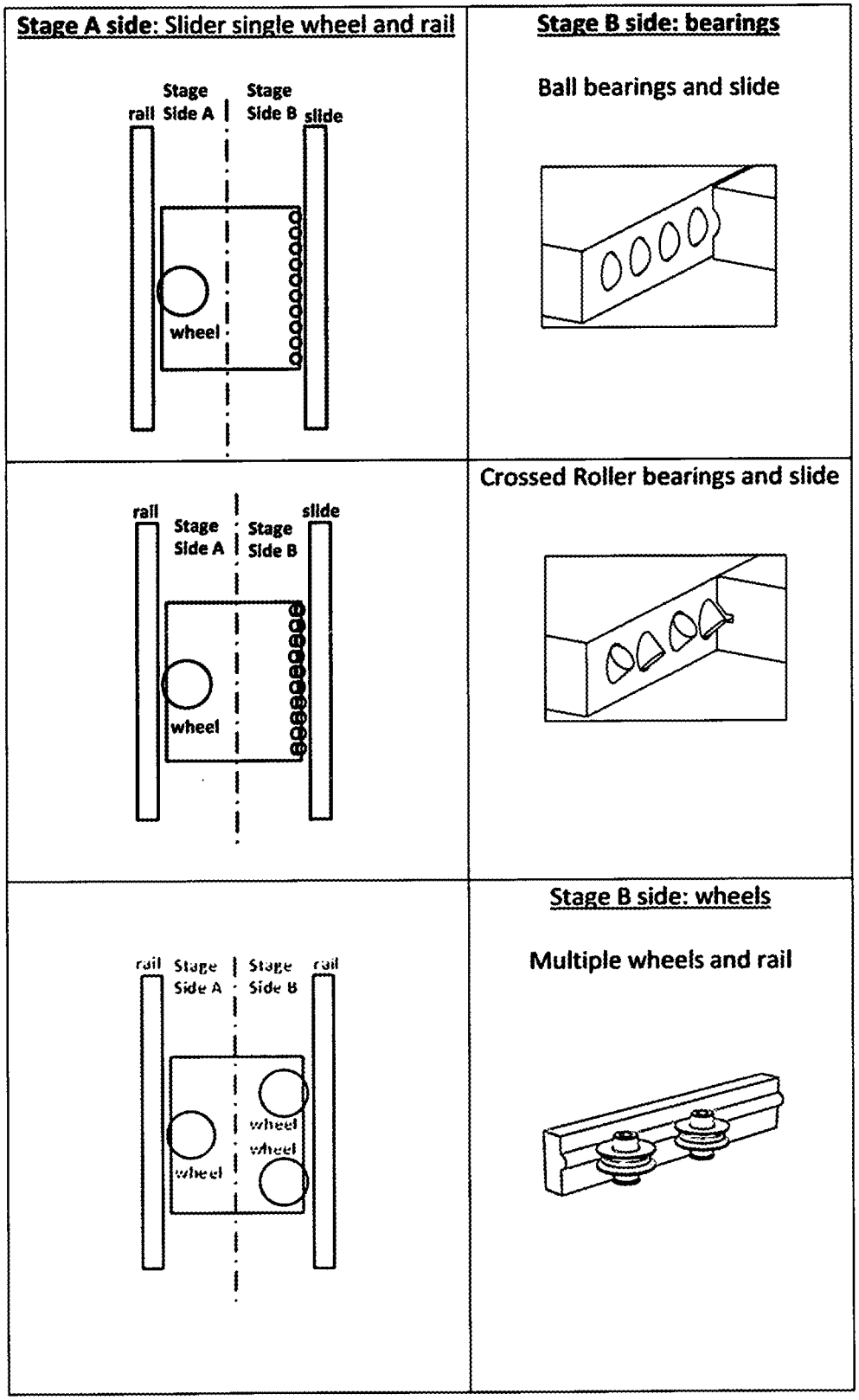
FIG. 22B is the second page of the option table showing a slider single wheel and rail for stage side A and various bearings for stage side B.
Figure 22C:
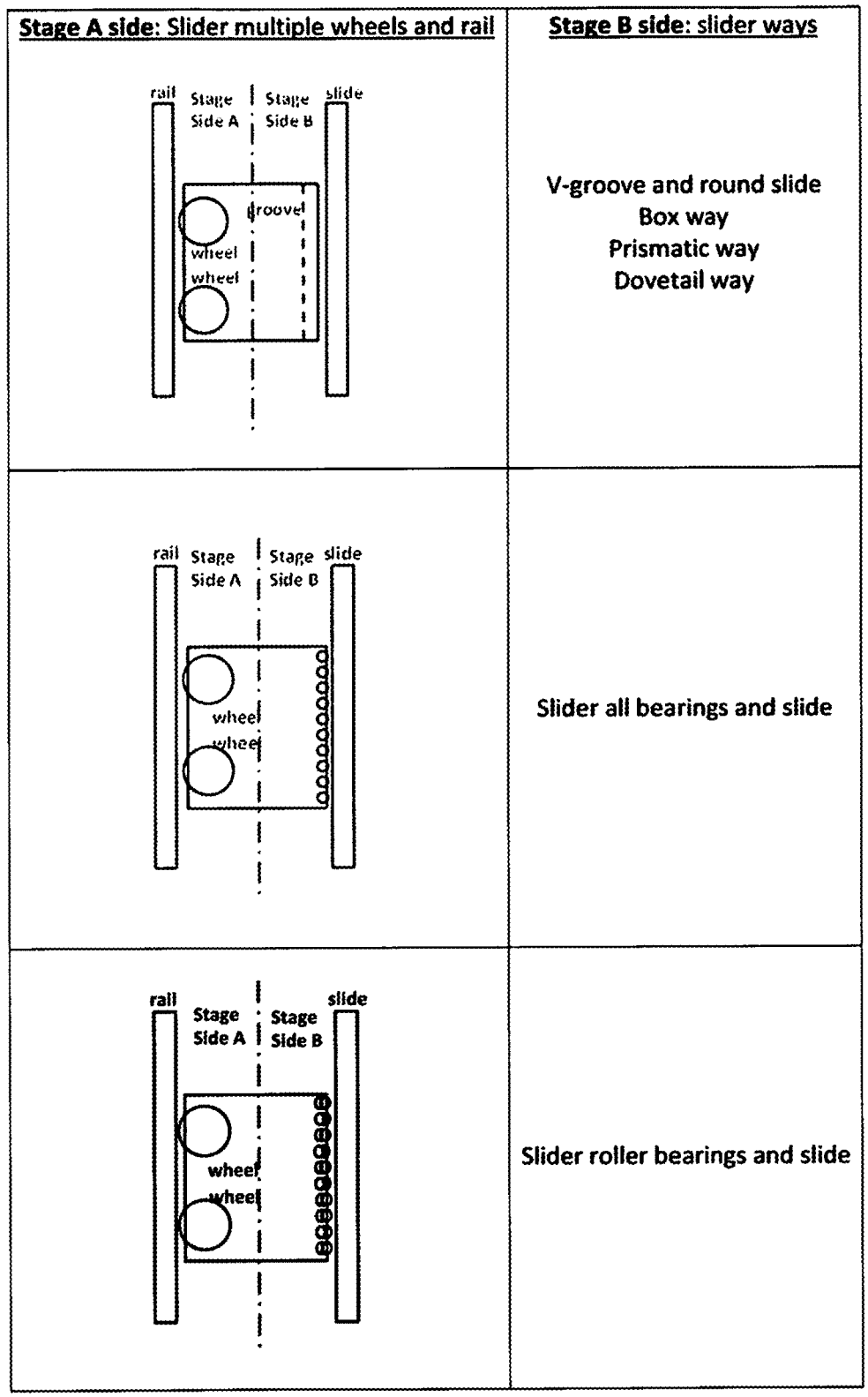
FIG. 22C is a third page of the option table showing slider multiple wheels and rail for stage side A and various slider ways for stage side B.
Figure 22D:
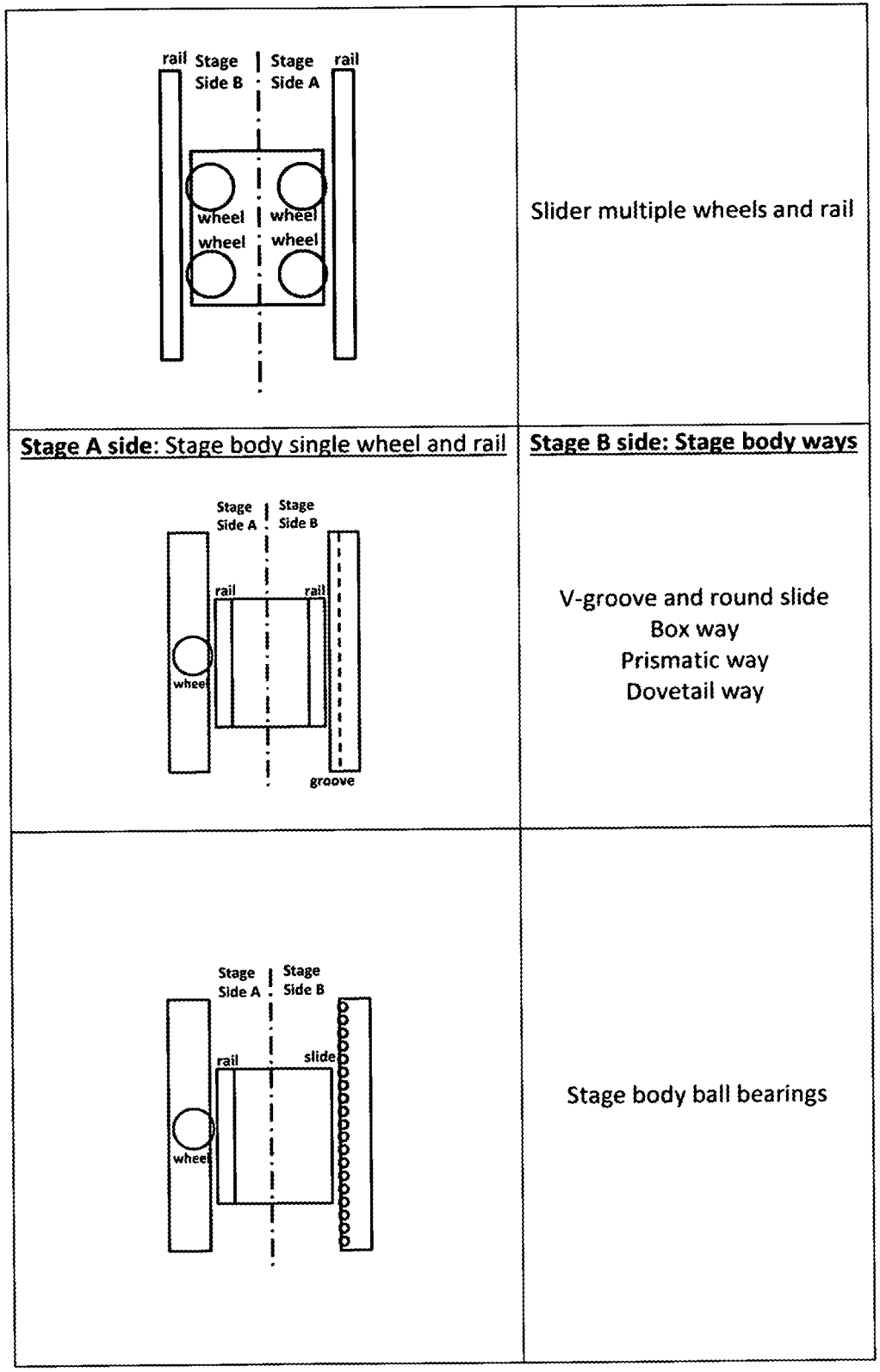
FIG. 22D is a fourth page of the option table that continues FIG. 22C options and additionally shows a stage body single wheel and rail for stage side A and various stage body ways for stage side B.
Figure 22E:
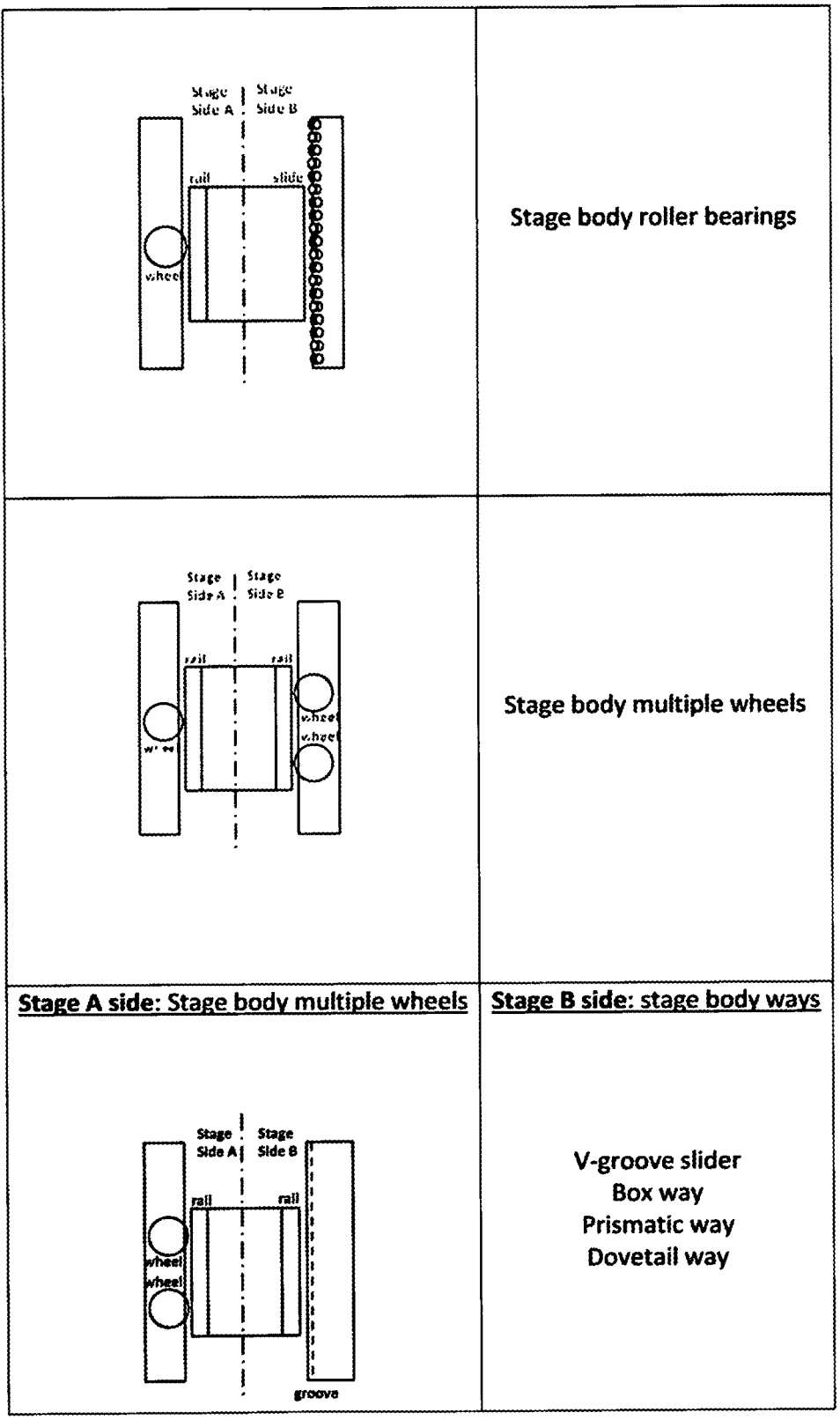
FIG. 22E is a fifth page of the option table that continues FIG. 22D options and additionally shows stage body multiple wheels for stage side A and various stage body ways for stage side B.
Figure 22F:
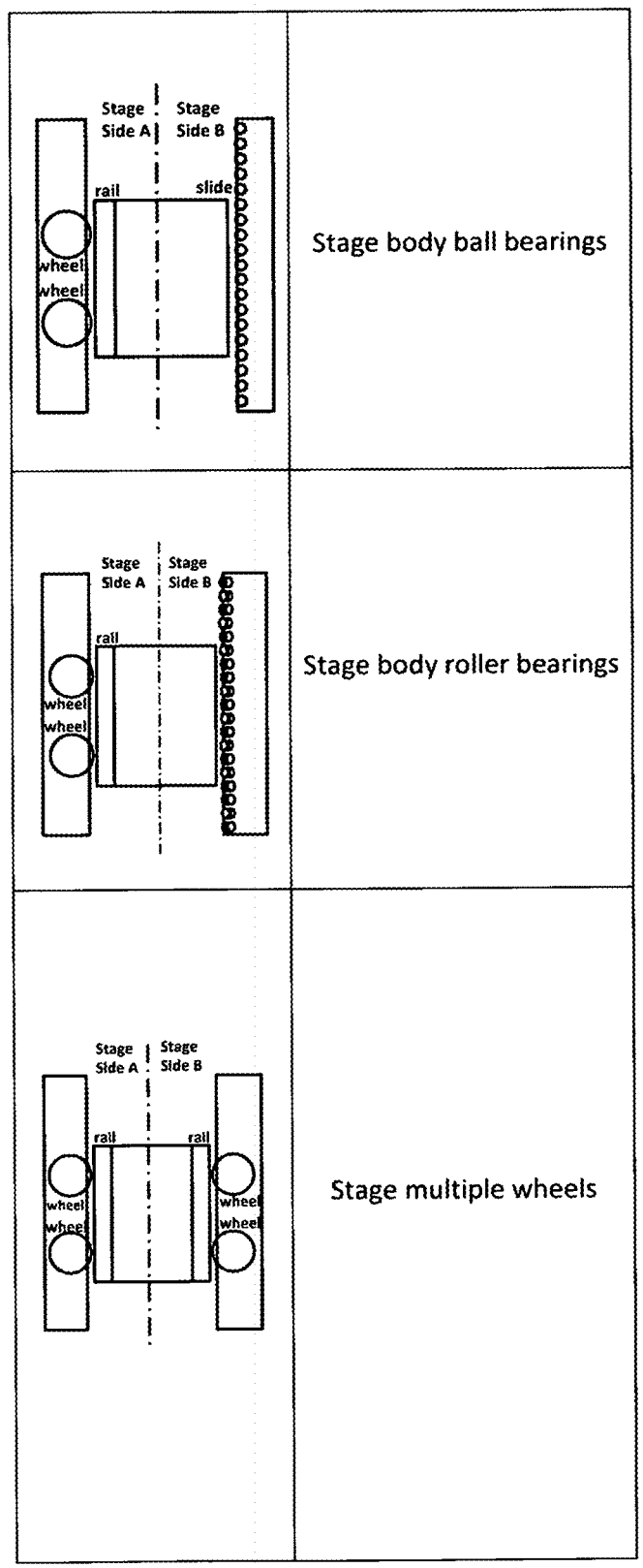
FIG. 22F is a sixth page of the option table that continues FIG. 22E options.

FIGS. 21A through 21C depict a stage embodiment that makes use of a linear motor in lieu of a rotary motor and lead screw. The top view of the linear motor driven stage 201 is shown in FIG. 21A. The stage slider 203 is situated within the stage body frame 205 and the stage bottom 211. Limit switches 213 are shown at the ends of the stage. Cover plate 207 houses the guide wheel and the opposing side 209 of the slider 203 contains a linear motor magnet rod discussed below.

In the bottom side 229 of the stage slider 203 depicted in FIG. 21B, the components of the linear motor are shown—magnet rod 223 and forcer 225. An example of this type of motor is model S040 available from Nippon Pulse America, Inc., 4 Corporate Drive, Radford, Va. 24141. The linear motor magnet rod 223 is captivated and retained in the stage slider 203 by retaining blocks 221 that are fastened to the stage slider 203 with screws. The linear motor forcer 225 is mounted coaxially with the magnet rod 223, but is mounted with screws to the stage body base as shown in FIG. 21C. In constructing the stage, first, the linear motor magnet rod 223 is inserted into the linear motor forcer 225 and this assembly is placed in the bottom of the stage slider 203. The magnet rod 223 is inserted into the retaining blocks 221 as shown in FIG. 21B and the retaining blocks 221 are affixed with screws to the stage slider 203. Next, the stage slider 203 is placed in the stage body. An optical glass scale 233 for use in concert with an optical linear position encoder, to be described below, is shown mounted to the bottom of the stage slider 203.

Before placement of the stage slider 203 in the stage body, the linear motor forcer 225 is positioned at the longitudinal midpoint of the linear motor magnet rod 223. Once the stage slider 203 is installed in the stage body, the linear motor forcer 225 is attached with screws to the bottom 211 of the stage body as depicted in FIG. 21C. Not shown is the routing of the electrical connections 227 from the linear motor forcer 225 through the base of the stage so there are no moving electrical connections. Also mounted in the bottom 211 of the stage body, is a linear encoder 241 that will sense position along the optical glass scale 233 attached to the stage slider 203. Linear encoder 241 must be of limited size to fit in the bottom 211 of the stage body. Example candidate encoders that meet the size requirement comprise the chip series MicroE linear encoders from Celera Motion, 125 Middlesex Turnpike, Bedford, Mass. 01730-1409; these encoders are approximately 6 millimeters square in the lateral dimensions. As in the case of the linear motor forcer 225, the electrical connections to the linear encoder 241, not shown, are routed through the stage body to insure no moving electrical connections.

Other Displacement Sensors

The disclosed precision drive can make use of any number of conventional linear or rotary encoder position sensors that are useful for differential and absolute position sensing and support closed loop control of motion. A low profile approach is to adapt a capacitive plate sensor after the fashion of U.S. Pat. No. 4,586,260 in the motion-controlled stage.

Preload Mechanisms

In addition to the flexure-based accommodation of preload of the ways, various preload actuation schemes are within the scope of this disclosure and include springs, and also mechanisms that can apply variable or tunable preloads such as piezoelectric, and magnetostrictive devices.

Different Stage Embodiments Using the Roller Guide Wheel with Alternative Ways

The disclosed roller guide wheel can be used in combination with other machinery ways (or slides) for slider motion on stages and other applications. In general, ways may comprise sliding components such as box, dovetail, or prismatic slides, or rolling components such as roller wheels, ball bearings, and roller bearings with their corresponding contact surfaces. These rolling components can support one or both sides of the stage body or one or both sides of the stage slider.

A taxonomy of different combinations of guide wheels and various other rolling and sliding contacts is provided in FIGS. 22A through 22G which comprise a single contiguous table when placed end-to-end. Different contact combinations for side A (left) or side B (right) of the stage are provided. Also, pictorial descriptions of the various rolling and sliding components are provided in the table as applied to either the stage slider or the stage body.

Embodiments of a Rotary Stage Employing Roller Guide Wheels

For either manual or motorized rotary stages, a rotary table can be supported by the roller guide wheel in concert with a precision circular reference rail.

Motorized Rotary Stages

Figure 23:
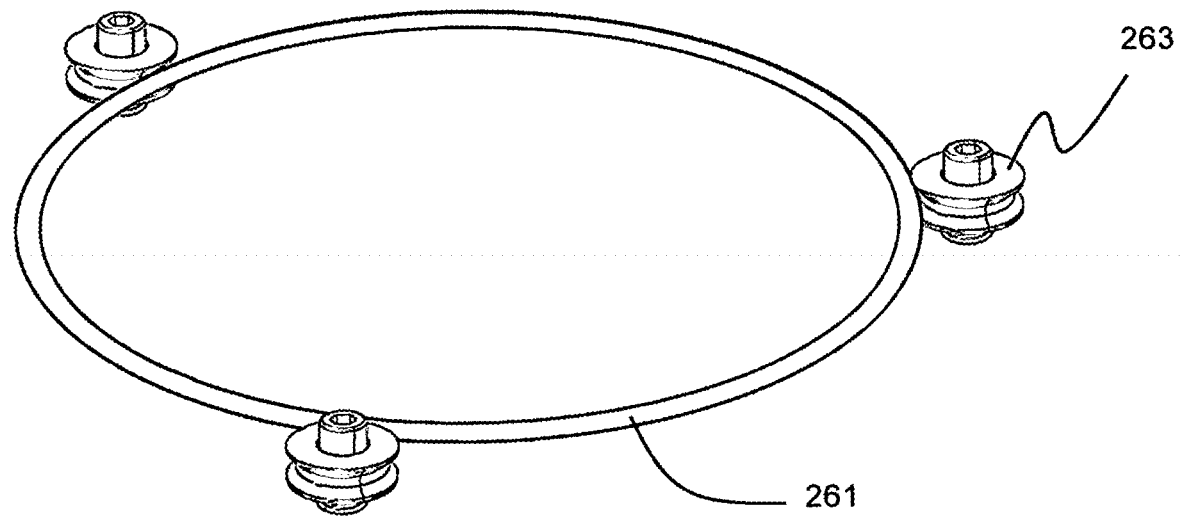
FIG. 23 is a pictorial diagram of roller guide wheel and reference rail geometry.
Figure 24:
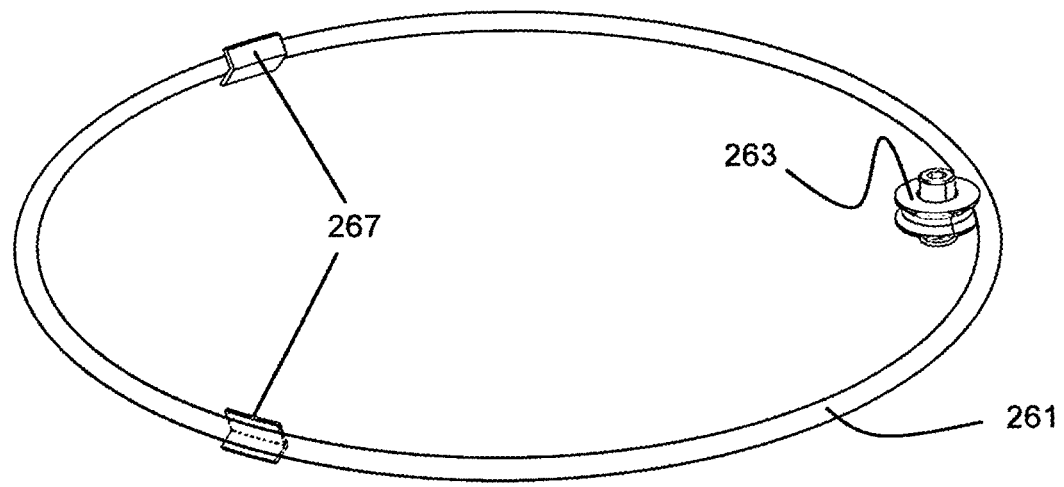
FIG. 24 is a pictorial diagram of roller guide wheel, v-groove contact, and reference rail geometry.
Figure 25:
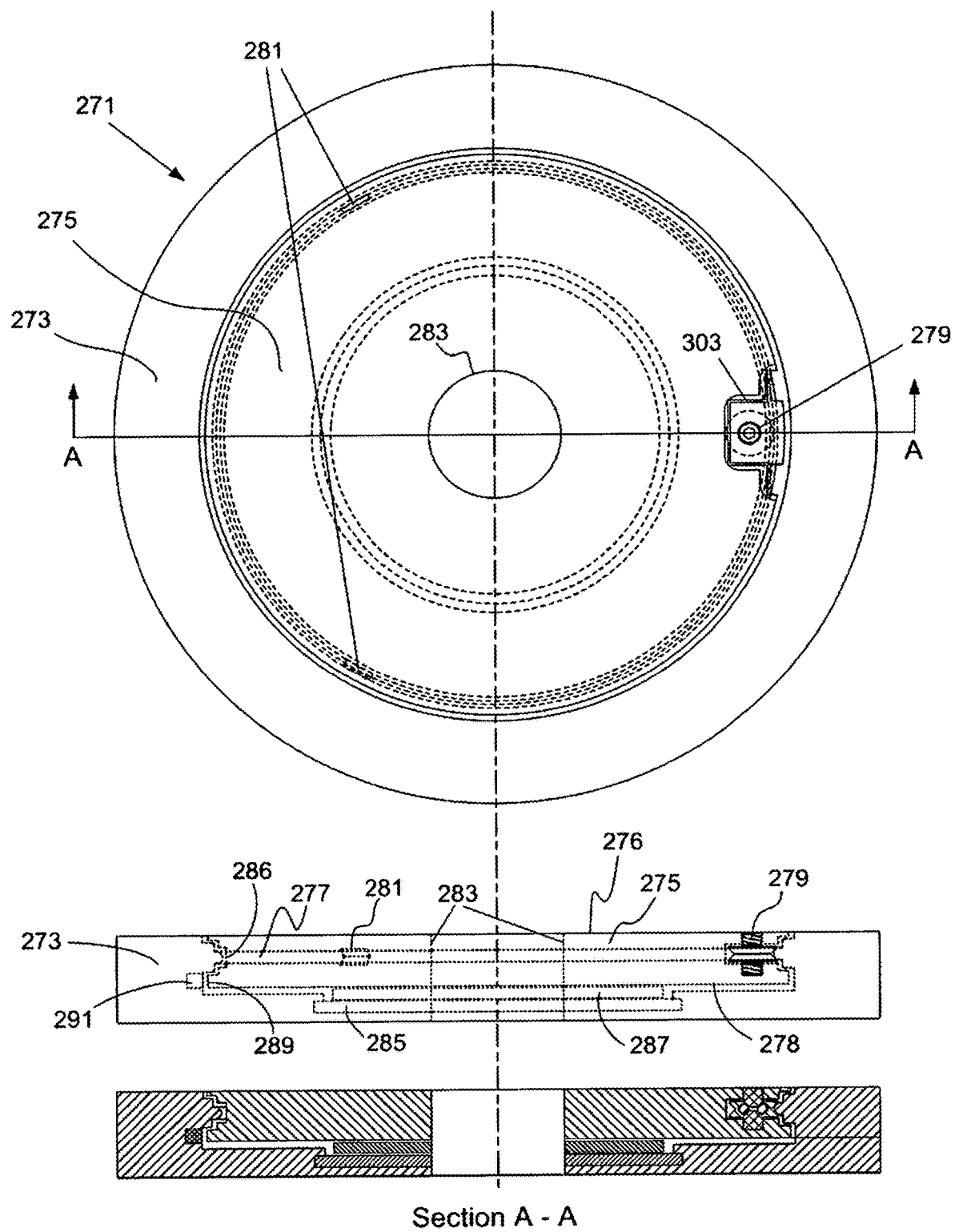
FIG. 25 is a plan view and cross sectional diagram of a rotary stage employing a rotary guide wheel.

FIG. 23 depicts the geometry of roller guide wheels 263 that would be supported in a stage body and a reference rail 261 that would part of the rotary table mounted within the stage body. A preferred geometry is depicted in FIG. 24 wherein the reference rail 261 would be a stationary part of the stage body and the roller guide wheel 263 along with curved v-groove slider contacts 267 would be mounted in the rotary table. In this geometry, the roller wheel can be contained in a flexure shown in FIG. 25 so that the v-groove slider contacts 267 would be preloaded against the stationary reference rail 261, thereby preventing eccentricity and tilt of the rotational axis of the table. This preload condition is analogous to the geometry of the linear stage shown in FIG. 8 and the flexure design follows the discussion for linear stages above. Alternatively, the two v-groove slider contacts 267 could be replaced with two roller guide wheels 263 that are mounted in the rotary table, each without flexures. Additionally, other preload mechanisms previously discussed can be employed The disposition of the components of a rotary stage 271 is illustrated in FIG. 25. The outer stage body 273 encloses rotary table 275 exhibiting a central through hole 283, circumferential surface 286, and top and bottom faces, 276 and 278, respectively. The roller guide wheel 279 is contained within a portion of the rotary table 275 that exhibits a flexure cutout 303. Upon installation of the rotary table 275 in the stage body 273, this flexure is compressed in order to place the roller guide wheel 279 and the v-groove slider contacts 267 against the precision reference rail surface 277. The three regions of contact with the precision reference rail surface 277 by the roller guide wheel 279 and the two curved v-groove slider contacts 281 have a 120 degree angular separation for symmetric application of forces. The v-groove slider contacts 281 have a contact surface curvature that matches the radius of the precision reference rail surface at the contact locations, resulting in two parallel curvilinear contact curves for each such v-groove slider contact. The use of additional roller guide wheels and/or curved v-groove sliders are within the scope of this concept.

Figure 26:
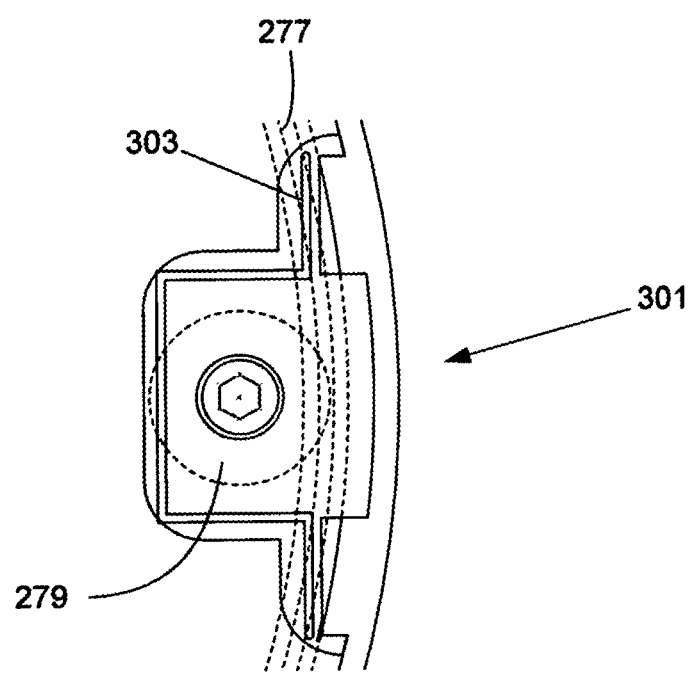
FIG. 26 is an enlargement of the preload mechanism and roller guide wheel of FIG. 25.

An enlargement 301 of the roller guide wheel 279 in contact with the precision reference rail surface 277 and in proximity to the flexure cutout 303 is depicted in FIG. 26.

The motor for driving the rotary table 275 can be selected from a number of options including the conventional combination of geared-motor and worm screw, a pancake motor, a printed circuit board (PCB) motor (www.pcbmotor.com), and various other piezo electric motors. The prime mover implementation depicted in FIG. 25 is that of a printed circuit board motor wherein a rotor 287 is attached to the bottom face 278 of rotary table 275. Rotor 287 is affixed to the stage body 273 and is in contact with the stator 285 by captivation means not shown.

The circular table can be magnetically coupled with the prime mover so as to avoid coupling of forces characterized by other than the intended coaxial torque vector. One approach to confining the magnetic flux to the volume used for coupling torque is the use of Halbach magnet arrays as described in U.S. Pat. No. 6,841,910 to Gery.

In all implementations, attention is to be paid to minimizing or eliminating torque ripple by various active and passive strategies known in the prior art.

Sensing of the angular position of table 275 for the purposes of feedback control and measurement can be achieved by means of any of a number of commercially-available sensor types. These include magnetic rotation sensors such as the AS5600L from Austria Micro Systems, conventional rotary encoders, and rotary optical encoders such as the RESOLUTE read head and REXA30 stainless ring with optical ruling from Renishaw plc, Gloucestershire, UK. Conventional rotary encoders that are rotation shaft mounted would obscure the through hole 283. Hence, in FIG. 25 is depicted the preferred implementation, a rotary optical encoder. An optical ruling is in place around the circumferential surface 289 of the rotary table 275. In proximity to the surface 289 is an optical read head 291 mounted in the rotary stage body 273.

Manual Rotary Stages

For manual stages, the use of the disclosed guide wheel-based rotary table support is straightforward. Direct or geared attachment of a manual actuator to the rotary table is well known in the prior art; a common implementation is that of a worm shaft and worm gear combination.

The invention claimed is:

1. A precision motion device comprising:
   a. a wheel exhibiting an outer surface, a rotation axis, upper and lower apertures coaxial with the rotation axis, and an internal bearing outer race, the internal bearing outer race further comprising three coaxial surfaces:
      i. a right circular cylindrical surface exhibiting a diameter and an upper and lower perimeter,
      ii. an upper conical surface exhibiting a first and second circular perimeter,
      iii. a lower conical surface exhibiting a first and second circular perimeter, the first circular perimeter of both the upper and lower conical surfaces of diameter equal to the diameter of the right circular cylindrical surface, the second circular perimeter of both the upper and lower conical surfaces of diameter smaller than the diameter of right circular cylindrical surface, the first circular perimeter of the upper conical surface mating with the upper perimeter of the right circular cylindrical surface, the first circular perimeter of the lower conical surface mating with the lower perimeter of the right circular cylindrical surface, the second circular perimeters of the upper and lower conical surfaces forming the upper and lower apertures of the wheel coaxial with the rotation axis, respectively,
   b. a wheel housing with threaded apertures exhibiting a first and second receiving thread, respectively,
   c. a set of spherical ball bearings,
   d. a first conically-tapered set screw exhibiting means for screw advancement in the first receiving thread,
   e. a second conically tapered set screw exhibiting means for screw advancement in the second receiving thread, the wheel placed within the wheel housing and coaxial with the wheel housing threaded apertures, and the set of ball bearings placed internal to the wheel and seated along the outer race, screw advancement of the conically-tapered set screws within the threaded apertures of the housing bringing the respective conically-tapered set screw surfaces into proximity and in contact with the bearings, together forming a bearing inner race exhibiting upper and lower conical surfaces, individual bearings of the bearing set each thereby constrained to make single points of contact with the upper and lower conical surfaces of the outer race, respectively, and to make single points of contact with the upper and lower inner race conical surfaces formed by the set screws, respectively, thereby creating a four-point contact bearing assembly, the outer race comprising a set of precision surfaces machined into the wheel interior and the bearings forced into contact with the outer race so as follow this precision surface as they undergo motion within the races.

2. A precision motion device as recited in claim 1, wherein the first set screw exhibits a first end that is tapered and a second end that is un-tapered, the tapered end exhibiting a precision cylindrical extension that is smaller in diameter than the maximum width of the first set screw and is coaxial with the axis of the first set screw, and the second set screw similarly exhibiting a first end that is tapered and a second end that is un-tapered, but with a precision cylindrical cavity that is coaxial with the axis of the second set screw extending from its tapered end to a depth within the second set screw that will accommodate the cylindrical extension of the first set screw, the cylindrical extension of the first set screw of a diameter to precisely fit within the cylindrical cavity of the second set screw for the purpose of maintaining coaxial alignment of the first and second set screws when the set screws are advanced within the wheel housing threaded apertures.

3. A precision motion device as recited in claim 2, wherein the cylindrical extension and cylindrical cavity have shapes taken from the group comprising: a) right circular cylinders, b) right hexagonal cylinders, and c) right rectangular cylinders.

4. A precision motion device as recited in claim 1, wherein the set screws each exhibit cylindrical bores of the same diameter that are coaxial with each set screw and accommodate insertion of a cylindrical mandrel for maintaining coaxial alignment of the first and second set screws when the set screws are advanced within the housing threaded apertures.

5. A precision motion device as recited in claim 4, wherein the cylindrical mandrel and cylindrical bores have shapes taken from the group comprising: a) right circular cylinders, b) right hexagonal cylinders, and c) right rectangular cylinders.

6. A precision motion device as recited in claim 1, which further comprises the components of a precision linear stage:
   f. a stage body further comprising:
      i. a proximal end,
      ii. a distal end,
      iii. a primary rail exhibiting a precision reference surface,
      iv. a secondary rail,
      v. a motor compartment containing a motor, the motor exhibiting a shaft and an electrical connection,
      vi. a stage bottom supporting the distal and proximal stage ends, the primary rail and the secondary rail, and the motor compartment,
      vii. a lead screw receiving socket placed within the distal end of the stage,
   g. a stage slider further comprising:
      i. the precision motion device of claim 1 serving as the roller guide wheel with wheel housing, the roller guide wheel supporting slider translation along the secondary rail by rolling contact,
      ii. a preload flexure formed in the slider that permits preload of the roller guide wheel against the secondary rail,
      iii. a set of V-groove contacts for sliding along the primary rail,
      iv. a lead screw nut mounted within the slider,
   h. a lead screw,
   i. a motor gearhead attached to the shaft of the motor and coaxial with the shaft of the motor for transfer of drive power to the lead screw,
   j. a lead screw preload spring coaxial with the lead screw and providing compressive force of the lead screw against the lead screw receiving socket,
   k. a lead screw gearhead attached to the lead screw at the proximal end of the stage,
the proximal end of the stage body exhibiting mounting fixtures for the motor gearhead and the lead screw gearhead, the distal end of the stage body having mounting means for the lead screw receiving socket, the primary rail supporting contact with the slider V-groove contacts and extending the length of the stage body, making contact with the proximal and distal ends of the stage body, the secondary rail supporting the slider roller guide wheel and extending the length of the stage body, making contact with the proximal and distal ends of the stage body, the lead screw threaded through the lead screw nut on the slider to impart drive motion upon rotation of the lead screw, the stage providing precision translation of the slider in accordance with the precision reference surface of the primary rail.

7. A precision motion device as recited in claim 6, wherein the flexure is formed by a cut through the full thickness of the slider circumscribing the wheel housing.

8. A precision motion device as recited in claim 7, wherein the flexure is located adjacent to one of the rails.

9. A precision motion device as recited in claim 1, which further comprises the components of a precision linear stage:
   f. a stage body further comprising:
      i. a proximal end,
      ii. a distal end,
      iii. a primary rail exhibiting a precision reference surface,
      iv. a secondary rail,
      v. a motor compartment containing a motor, the motor exhibiting a shaft and an electrical connection,
      vi. a stage bottom supporting the distal and proximal stage ends, the primary rail and the secondary rail, and the motor compartment, vii. a lead screw receiving socket placed within the distal end of the stage,
g. a stage slider further comprising:
i. the precision motion device of claim 1 serving as the roller guide wheel with wheel housing, the roller guide wheel supporting the slider translation along the secondary rail by rolling contact,
ii. a preload flexure formed in the slider that permits preload of the roller guide wheel against the secondary rail,
iii. a set of V-groove contacts for sliding along the primary rail,
iv. a lead screw nut mounted within the slider,
v. a mounting surface exhibiting a through hole,
h. a lead screw,
i. a motor bevel gearhead attached to the shaft of the motor and coaxial with the shaft of the motor for transfer of drive power to the lead screw,
j. a lead screw preload spring coaxial with the lead screw and providing compressive force of the lea d screw against the lead screw receiving socket,
k. a lead screw bevel gearhead attached to the lead screw at the proximal end of the stage,
the proximal end of the stage body exhibiting mounting fixtures for the motor bevel gearhead and the lead screw bevel gearhead, the distal end of the stage body having mounting means for the lead screw receiving socket, the primary rail supporting contact with the slider V-groove contacts and extending the length of the stage body, making contact with the proximal and distal ends of the stage body, the secondary rail supporting the slider roller guide wheel and extending the length of the stage body, making contact with the proximal and distal ends of the stage body, the lead screw threaded through the lead screw nut on the slider to impart drive motion upon rotation of the lead screw, the stage providing precision translation of the slider in accordance with the precision reference surface which is the primary rail.

10. A precision motion device as recited in claim 1, which further comprises the components of a precision linear stage:
f. a stage body exhibiting a longitudinal axis further comprising:
i. a proximal end,
ii. a distal end,
iii. a primary rail exhibiting a precision reference surface, the primary rail extending the length of the stage body, making contact with the proximal and distal ends of the stage body,
iv. a secondary rail for support of a slider roller guide wheel extending the length of the stage body, making contact with the proximal and distal ends of the stage body,
v. a stage bottom supporting the distal and proximal stage ends, and the primary and secondary rails,
vi. a linear motor forcer mounted in the stage body,
g. a stage slider further comprising:
i. the precision motion device of claim 1 serving as the roller guide wheel supporting slider translation along the secondary rail by rolling contact,
ii. a preload flexure formed in said slider that permits preload of the roller guide wheel against the secondary rail,
iii. a set of V-groove contacts for sliding along the primary rail,
iv. a linear magnet rod mounted within the slider and coaxial with the motor forcer,
v. a mounting surface above the linear motor forcer which exhibits a through-hole,
the stage forming a semi-kinematic structure that provides precision translation of the slider in accordance with the precision reference surface of the primary rail.

11. A precision motion device as recited in claim 1, which further comprises the components of a precision linear stage that includes a stage body and stage slider:
f. the stage body exhibiting a longitudinal axis and proximal and distal ends further comprising:
i. a primary rail or slide for support of the stage slider exhibiting a precision reference surface, the primary rail extending the length of the stage body, making contact with the proximal and distal ends of the stage body,
ii. a secondary rail for support of a slider roller guide wheel extending the length of the stage body, making contact with the proximal and distal ends of the stage body,
iii. a stage bottom supporting the distal and proximal stage ends, the primary rail, and the secondary rail,
iv. a linear motor forcer mounted in the stage body,
g. the stage slider further comprising:
i. the precision motion device of claim 1 serving as the roller guide wheel supporting the slider translation along the secondary rail by rolling contact,
ii. a preload flexure formed in the slider that permits preload of the roller guide wheel against the secondary rail,
iii. a linear magnet rod mounted within the slider and coaxial with the motor forcer,
iv. a mounting surface above the linear motor forcer which exhibits a through-hole,
h. a contact type taken from the group comprising a) box way, b) prism way, c) dovetail way, d) ball bearings, e) roller bearings, and f) multiple guide wheels, corresponding to the primary rail or slide of the stage body for contact translation along the primary rail or slide of the stage body,
the stage forming a semi-kinematic structure that provides precision translation of the slider in accordance with the precision reference surface which is the primary rail.

12. A precision motion device as recited in claim 1, which further comprises the components of a precision rotary stage:
a. a rotary table further comprising:
i. a cylindrical disk exhibiting a top face, a bottom face and a circumferential surface,
ii. at least one roller guide wheel as a support mechanism,
iii. at least two additional support mechanisms taken from the group comprising roller guide wheels and v-groove contacts,
b. a stage body further comprising:
i. a structure with a central volume for placement of the rotary table,
ii. a precision reference rail surface.

13. A precision motion device as recited in claim 12, which further comprises manual means for achieving rotation of the rotary table relative to the stage body.

14. A precision motion device as recited in claim 12, which further comprises motorized means for achieving rotation of the rotary table relative to the stage body.

15. A precision motion device as recited in claim 14, which further comprises means to sense the angular position of the rotary table relative to the stage body.

* * * * *